US012571155B2

(12) United States Patent
Kim et al.

(10) Patent No.: US 12,571,155 B2
(45) Date of Patent: Mar. 10, 2026

(54) LAUNDRY TREATING APPARATUS

(71) Applicant: LG Electronics Inc., Seoul (KR)

(72) Inventors: Junghan Kim, Seoul (KR); Jungsik Park, Seoul (KR); Yanggyu Kim, Seoul (KR); Jangseok Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 229 days.

(21) Appl. No.: 18/256,814

(22) PCT Filed: Jan. 24, 2022

(86) PCT No.: PCT/KR2022/001207
§ 371 (c)(1),
(2) Date: Jun. 9, 2023

(87) PCT Pub. No.: WO2022/158924
PCT Pub. Date: Jul. 28, 2022

(65) Prior Publication Data
US 2024/0026596 A1 Jan. 25, 2024

(30) Foreign Application Priority Data
Jan. 25, 2021 (KR) ........................ 10-2021-0010316

(51) Int. Cl.
*D06F 43/08* (2006.01)
*D06F 43/00* (2006.01)
(Continued)

(52) U.S. Cl.
CPC .......... *D06F 43/081* (2013.01); *D06F 43/005* (2013.01); *D06F 43/02* (2013.01);
(Continued)

(58) Field of Classification Search
CPC ...... D06F 43/00; D06F 43/005; D06F 43/007; D06F 43/02; D06F 43/04; D06F 43/08; D06F 43/081; B08B 7/0021
See application file for complete search history.

(56) References Cited

U.S. PATENT DOCUMENTS 5,904,737 A 5/1999 Preston et al.
5,970,554 A 10/1999 Shore et al.
(Continued)

FOREIGN PATENT DOCUMENTS

EP 1055766 A1 11/2000
WO WO 1999/13148 3/1999

OTHER PUBLICATIONS

International Search Report and Written Opinion in International Appln. No. PCT/KR2022/001207, mailed on May 13, 2022, 16 pages (with English translation).
(Continued)

*Primary Examiner* — David G Cormier
(74) *Attorney, Agent, or Firm* — Fish & Richardson P.C.

(57) ABSTRACT

The present disclosure relates to a laundry treating apparatus including a pressure vessel for accommodating carbon dioxide therein, a storage tank for storing carbon dioxide therein to supply carbon dioxide to the pressure vessel, a distillation tank for storing carbon dioxide discharged from the pressure vessel to remove foreign substances dissolved in carbon dioxide discharged from the pressure vessel, and a gas supply pipe for connecting the distillation tank and the pressure vessel to each other to supply gaseous carbon dioxide stored in the distillation tank to the pressure vessel.

11 Claims, 8 Drawing Sheets

(51) Int. Cl.
*D06F 43/02* (2006.01)
*F17C 7/02* (2006.01)

(52) U.S. Cl.
CPC ........ *F17C 7/02* (2013.01); *F17C 2205/0326* (2013.01); *F17C 2205/0352* (2013.01); *F17C 2221/013* (2013.01); *F17C 2227/0157* (2013.01); *F17C 2227/0302* (2013.01); *F17C 2250/03* (2013.01); *F17C 2250/043* (2013.01); *F17C 2250/0636* (2013.01); *F17C 2270/07* (2013.01)

(56) References Cited

U.S. PATENT DOCUMENTS

| | | | |
|---|---|---|---|
| 6,442,980 | B2 | 9/2002 | Preston et al. |
| 2004/0020510 | A1 | 2/2004 | Roseen |
| 2004/0255393 | A1 | 12/2004 | Brainard et al. |
| 2005/0034247 | A1* | 2/2005 | Uhlin ...................... D06F 43/00 8/142 |
| 2005/0108829 | A1 | 5/2005 | Preston et al. |
| 2006/0191300 | A1 | 8/2006 | Lim et al. |
| 2007/0256706 | A1 | 11/2007 | Ahlbom et al. |
| 2010/0163081 | A1 | 7/2010 | Ikemizu |
| 2013/0167558 | A1 | 7/2013 | Jassani et al. |
| 2015/0168023 | A1 | 6/2015 | Jassani et al. |

OTHER PUBLICATIONS

Office Action in Korean Appln. No.10-2021-0010316, mailed on Feb. 10, 2023, 8 pages (with English translation).
Extended European Search Report in European Appln. No. 22742900.8, mailed on Nov. 19, 2024, 12 pages.
Notice of Allowance in Korean Appln. No. 10-2023-0147936, mailed on Oct. 15, 2024, 2 pages (with English Translation).

* cited by examiner

[Fig. 1]
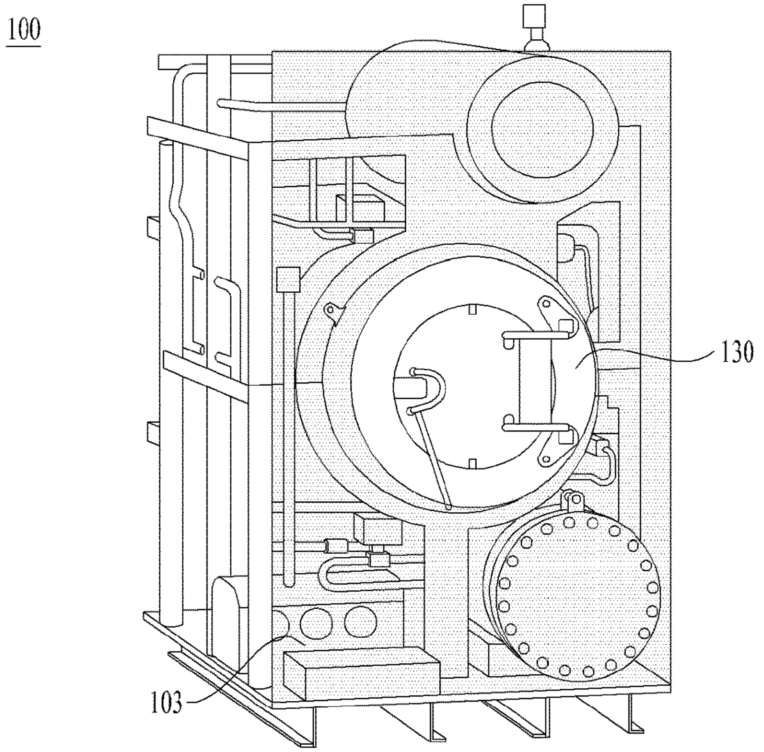
(a)
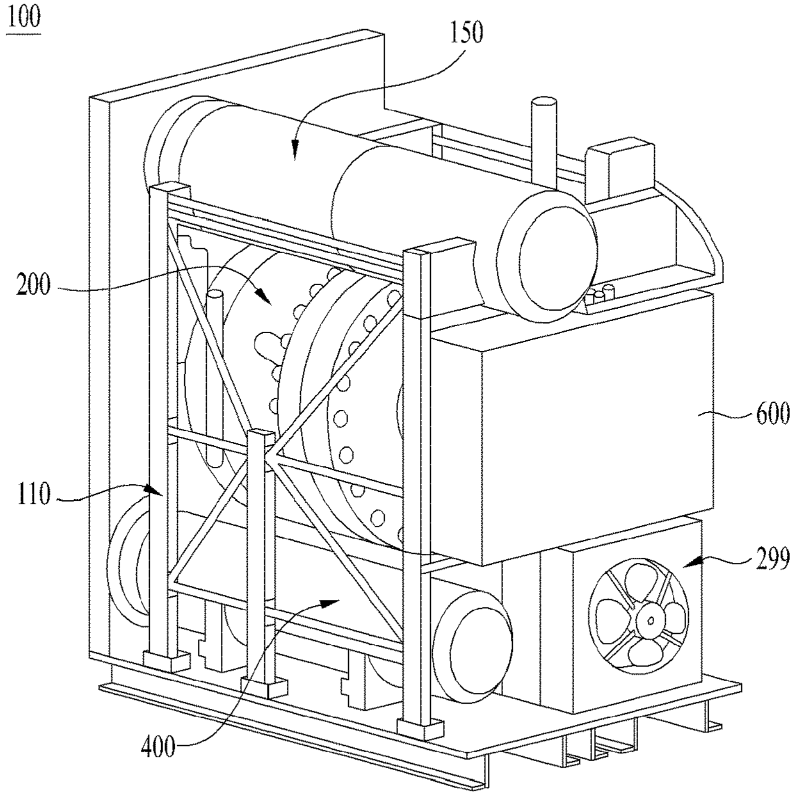
(b)

[Fig. 2]
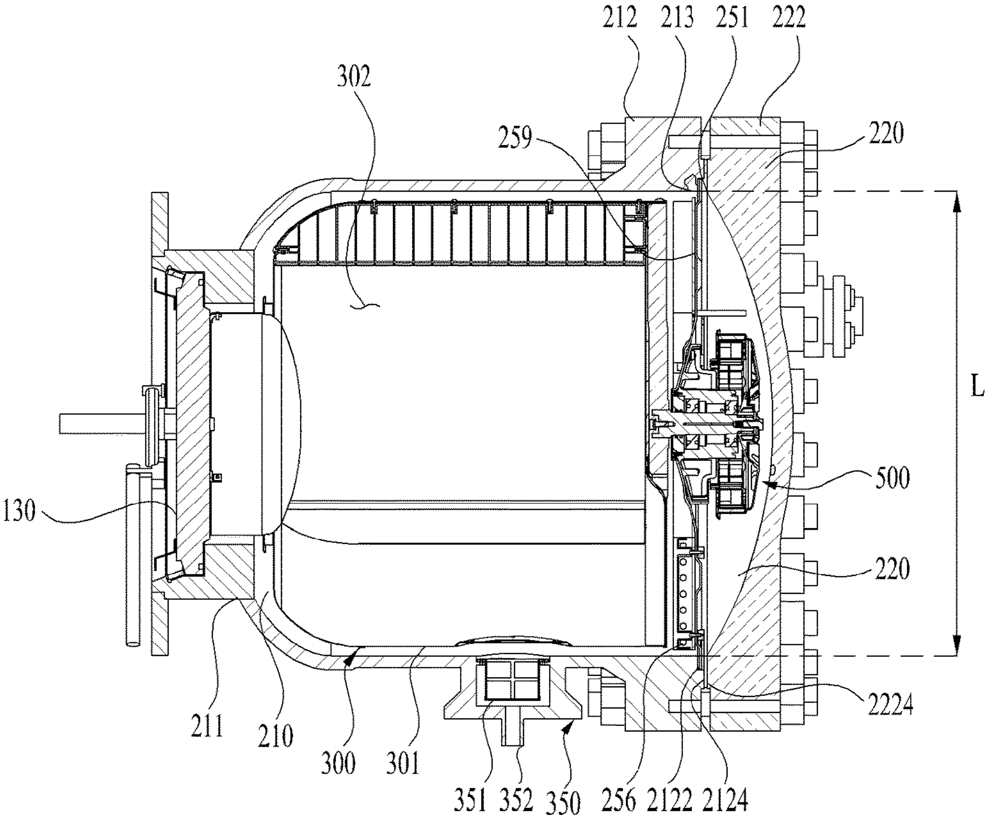
[Fig. 3]
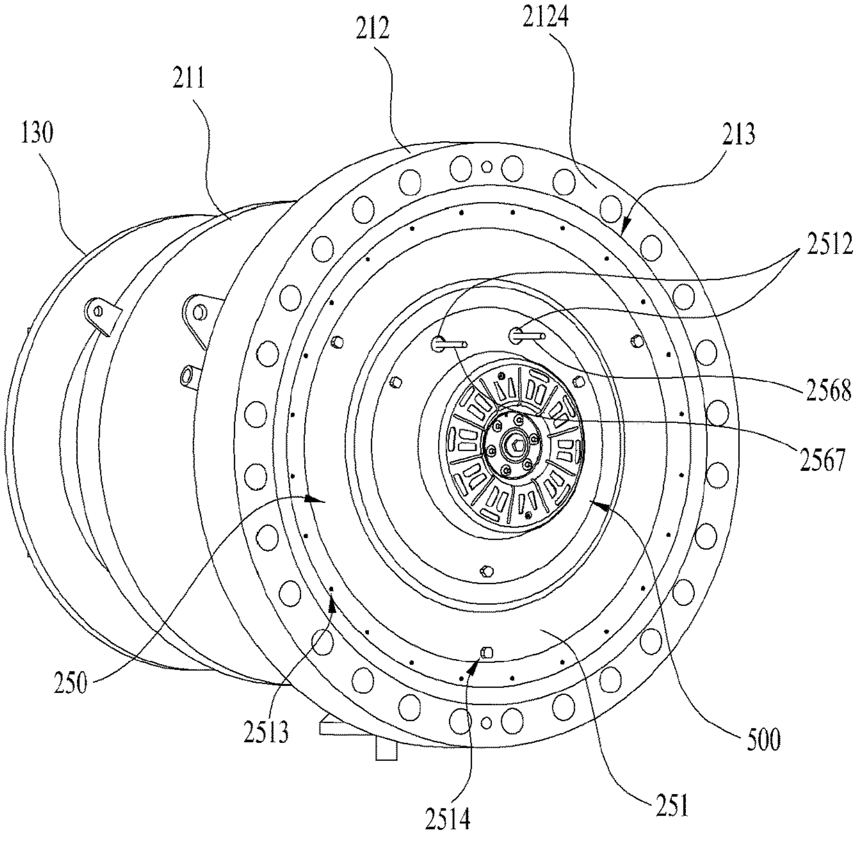

[Fig. 4]
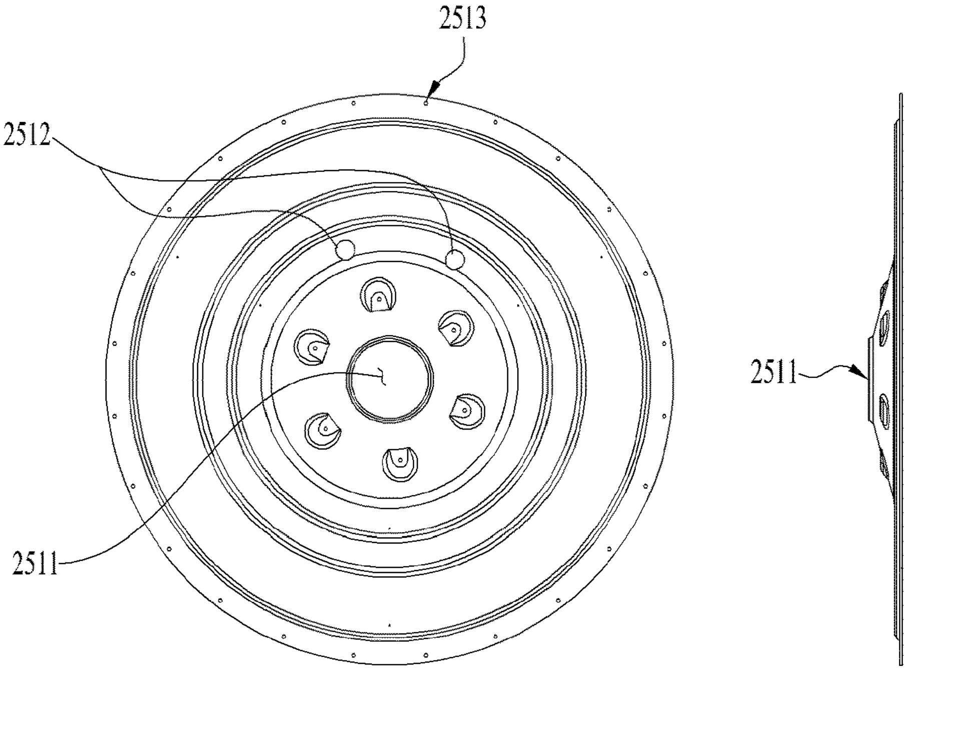
(a) (b)
[Fig. 5]
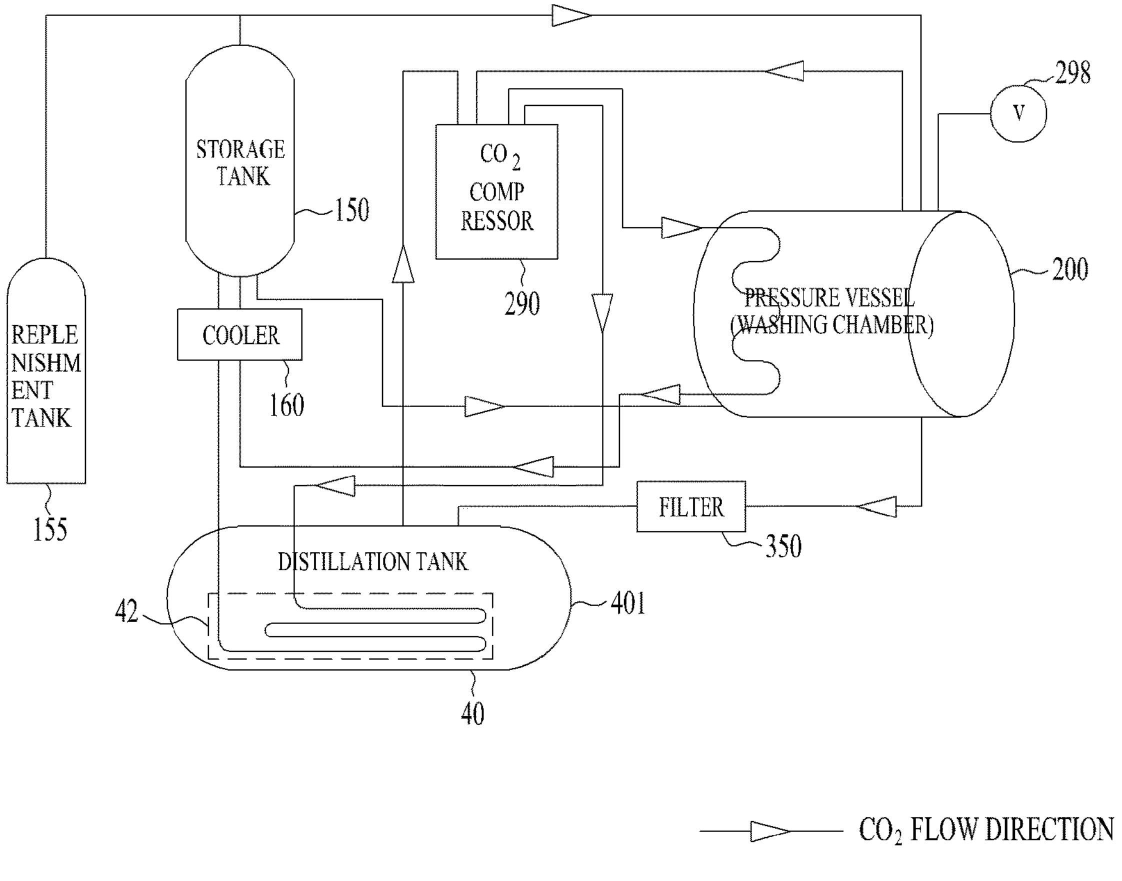

[Fig. 6]
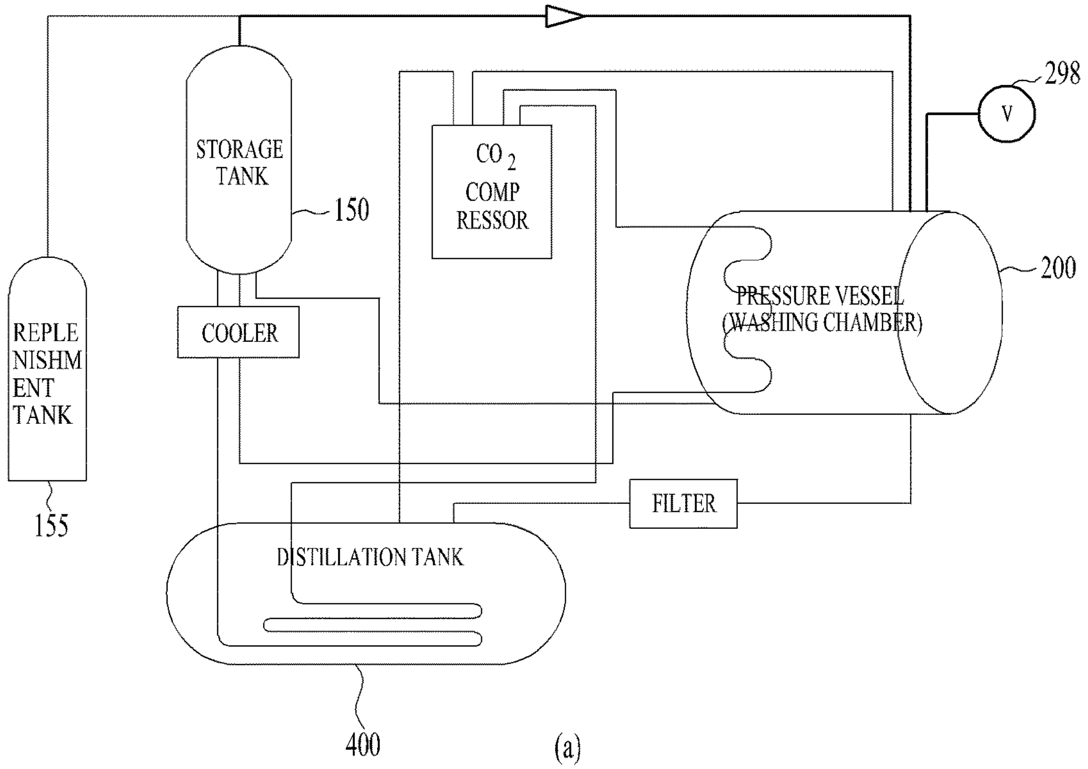
(a)
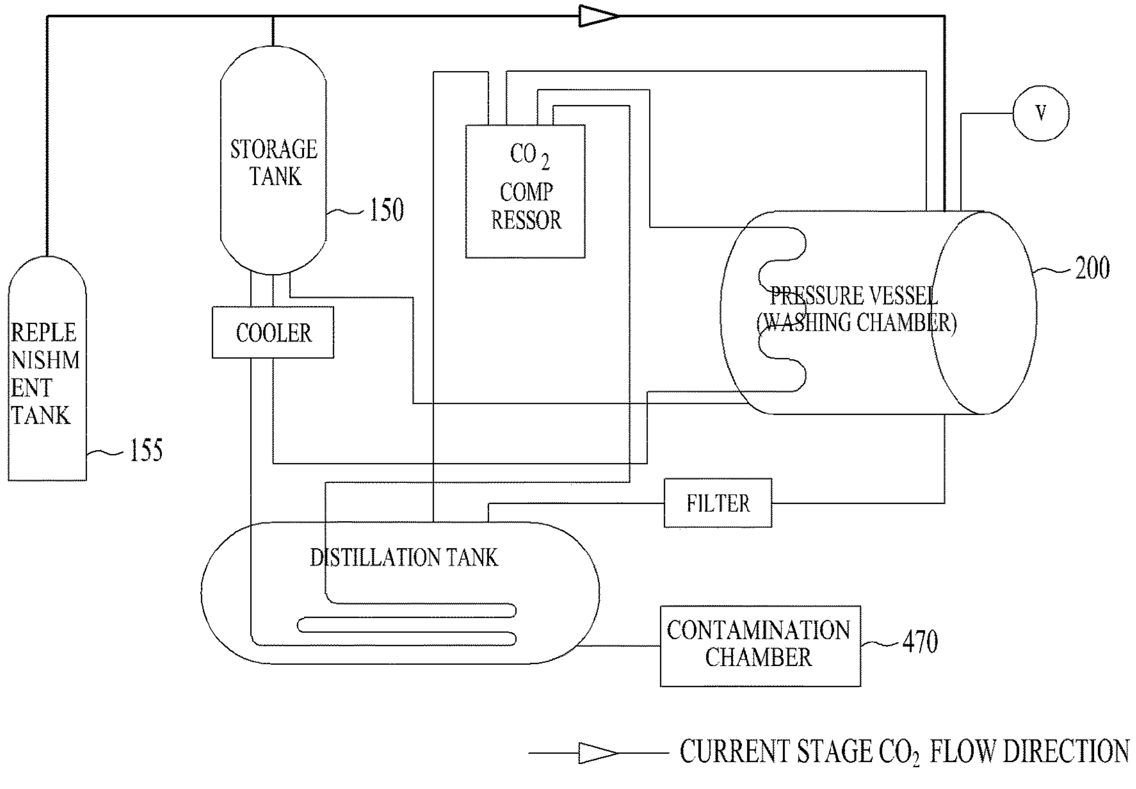
(b)

[Fig. 7]
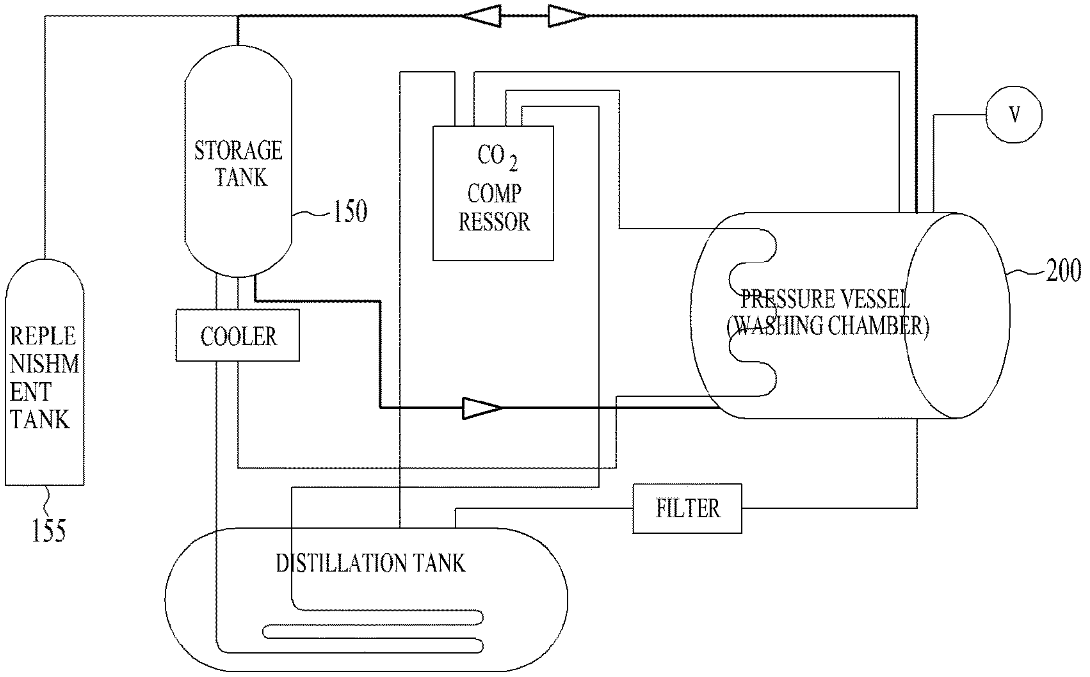
(a)
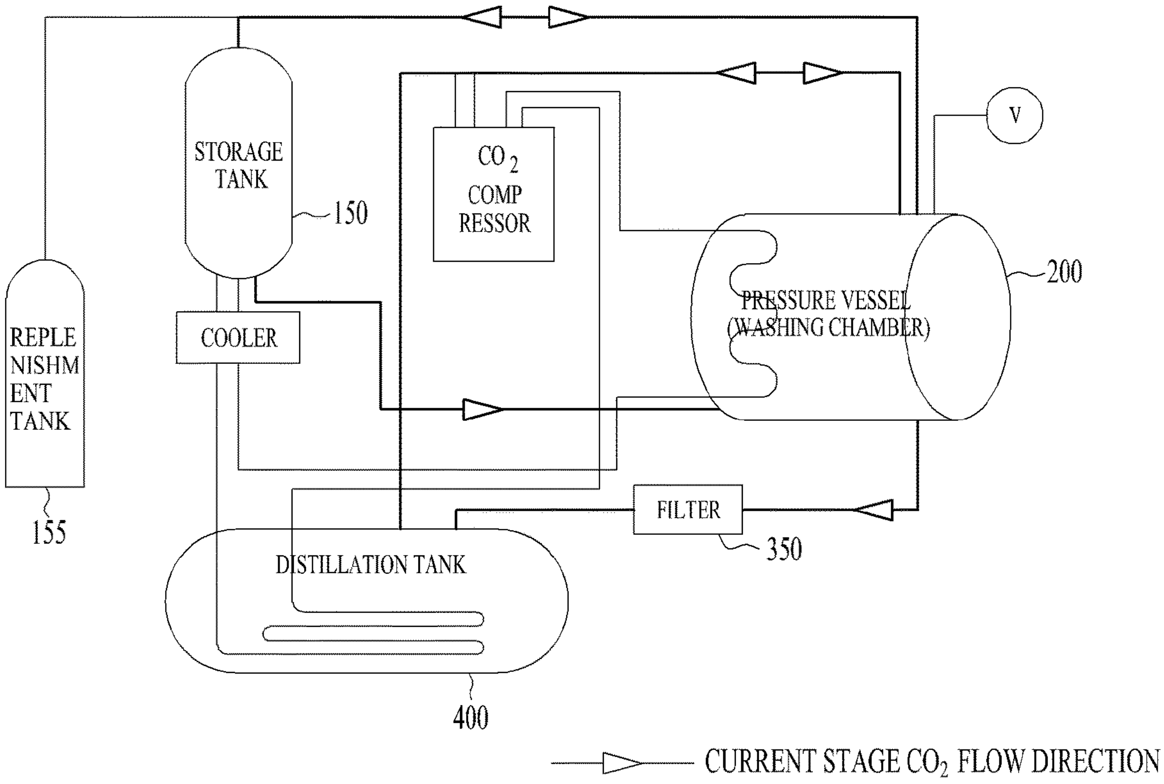
(b)

[Fig. 8]
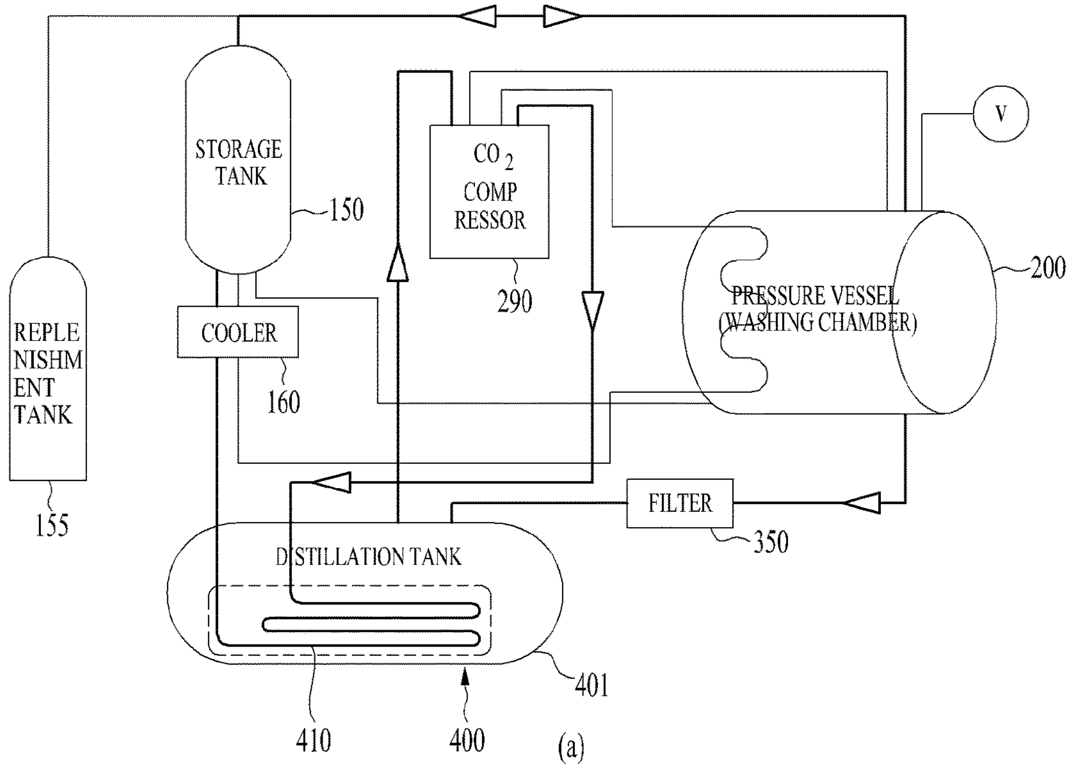
(a)
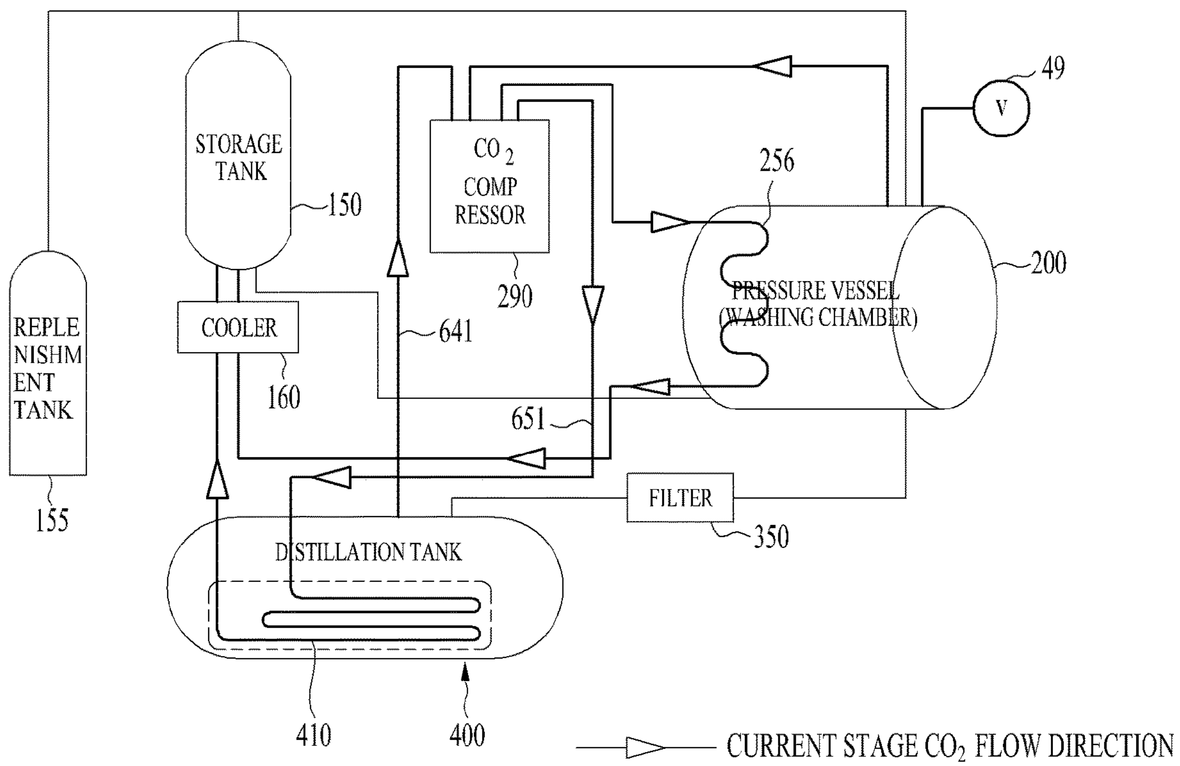
(b)

[Fig. 9]
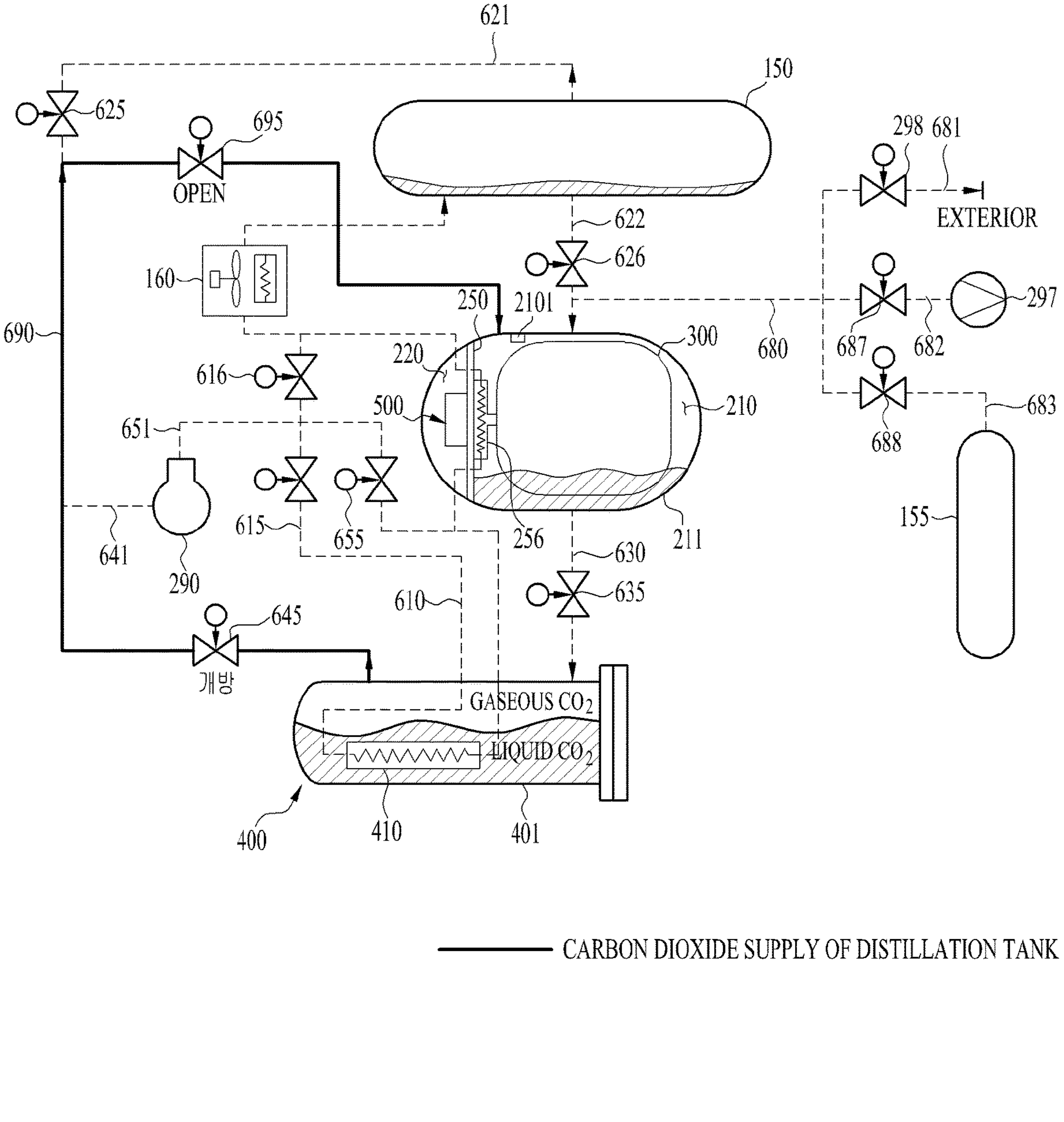

[Fig. 10]
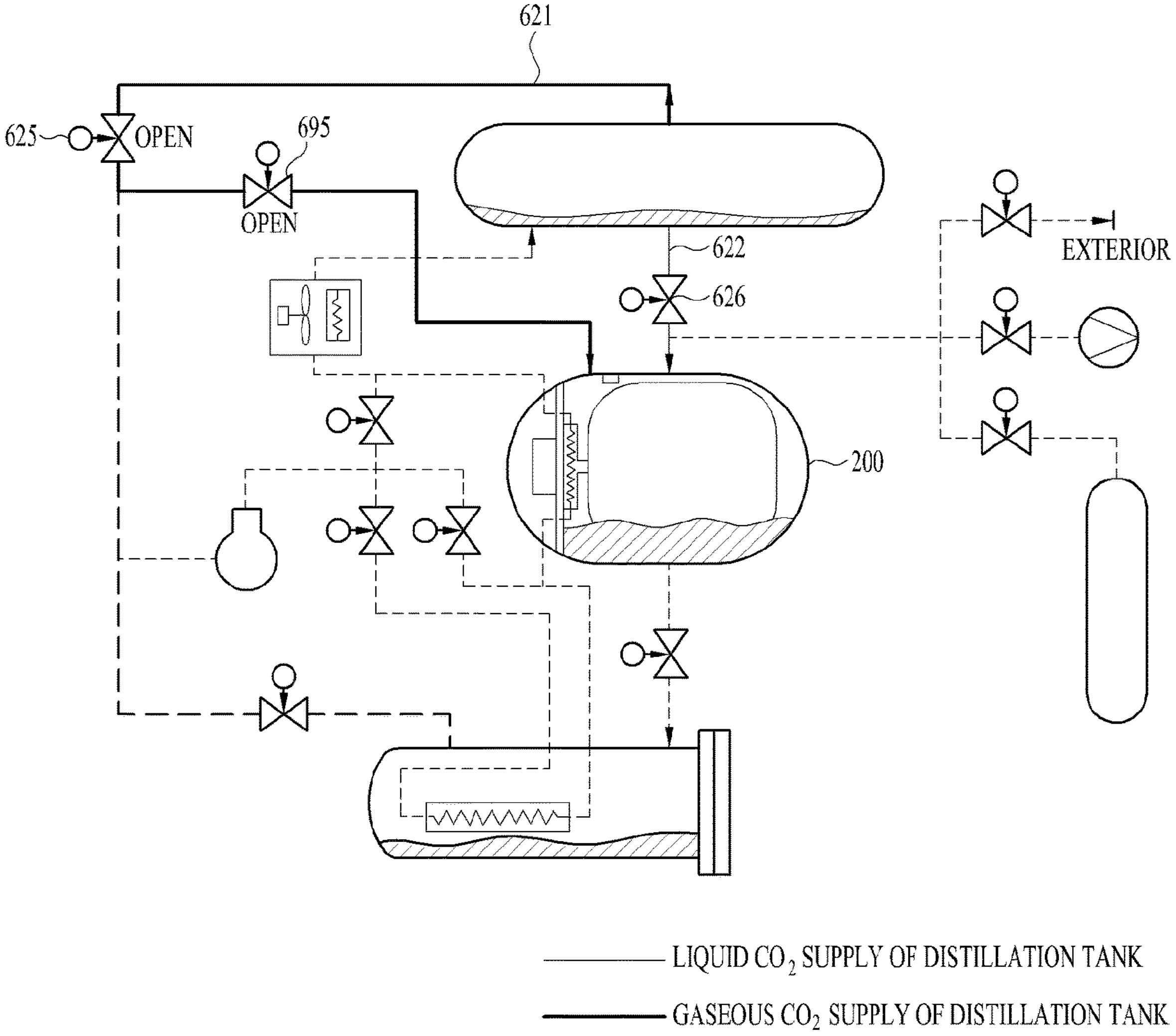

LAUNDRY TREATING APPARATUS

CROSS-REFERENCE TO RELATED APPLICATIONS

This application is a National Stage application under 35 U.S.C. § 371 of International Application No. PCT/KR2022/001207, filed on Jan. 24, 2022, which claims the benefit of Korean Application No. 10-2021-0010316, filed on Jan. 25, 2021. The disclosures of the prior applications are incorporated by reference in their entirety.

TECHNICAL FIELD

The present disclosure relates to a laundry treating apparatus and a method for controlling the same. More particularly, the present disclosure relates to a laundry treating apparatus that performs laundry treatment such as washing or the like using carbon dioxide.

BACKGROUND ART

A laundry treating apparatus may perform washing and drying laundry at home or in other places, and can remove wrinkles on the laundry. For example, the laundry treating apparatus can include a washing machine that washes the laundry, a dryer that dries the laundry, a washing machine/dryer that has both a washing function and a drying function, a laundry manager that refreshes the laundry, a steamer that removes the wrinkles from the laundry, and the like.

Recently, Carbon dioxide (CO2) may be used as a new cleaning solvent. Carbon dioxide is a colorless and odorless gas at an ambient pressure and at a room temperature, and carbon dioxide may evaporate when a washing process at a high pressure is completed and the pressure is lowered to the atmospheric pressure, which may obviate the need for a separate drying cycle. In some examples, as carbon dioxide is one of components of general atmosphere, carbon dioxide may not pollute the environment. In some examples, when a surfactant for carbon dioxide is used, it may be possible to remove hydrophilic foreign substances.

In addition, when using a distillation tank, carbon dioxide contaminated after the washing may be reused by removing only the foreign substances from the contaminated carbon dioxide and then distilling the contaminated carbon dioxide into clean carbon dioxide.

In a case of a laundry treating apparatus using carbon dioxide as a washing solvent, when a washing cycle starts, air remaining inside a pressure vessel accommodating therein a drum for laundry treatment should be discharged first. This is because a washing efficiency is lowered when there is gas or liquid other than carbon dioxide. Thereafter, gaseous carbon dioxide must be supplied to the pressure vessel accommodating therein the drum. To this end, gaseous carbon dioxide is supplied from a storage tank for storing carbon dioxide to the pressure vessel until the tank and the vessel reach equilibrium. Thereafter, liquid carbon dioxide stored in the storage tank is supplied to the pressure vessel using a vertical level difference in the pressure equilibrium state.

However, when the pressure vessel in a state close to a vacuum state reaches the pressure equilibrium by flow of gaseous carbon dioxide, an internal pressure of the storage tank is significantly reduced compared to an initial pressure state. As a result, gaseous carbon dioxide flows to the storage tank in a state in which a temperature of liquid carbon dioxide stored in a lower portion of the storage tank has dropped. When a capacity of the storage tank of carbon dioxide is reduced to reduce a size of the laundry treating apparatus, the temperature of liquid carbon dioxide may drop more.

This may drop a temperature of the laundry accommodated in the drum. In severe cases, the laundry may be frozen hard and a washing performance may decrease. In addition, it may negatively affect the washing performance by reducing a surface tension of liquid carbon dioxide.

In order to solve this problem, U.S. Pat. No. 6,442,980B2 discloses pressurizing the pressure vessel by compressing gas carbon dioxide of the distillation tank using a compressor. Another U.S. Pat. No. 5,904,737A discloses pressurizing the pressure vessel by compressing gaseous carbon dioxide in the storage tank using the compressor. However, the supply of gaseous carbon dioxide after the compression using the compressor to increase the temperature of the pressure vessel whose temperature has dropped after the internal pressure of the pressure vessel reaches the equilibrium pressure has a problem in that additional energy is required. In contrast, when supplying gaseous carbon dioxide to the pressure vessel through the storage tank, it is also possible to have a replenishment tank storing carbon dioxide and pressurize the pressure vessel through the replenishment tank. However, this has a problem in that an amount of carbon dioxide used increases by unnecessary use of carbon dioxide.

DISCLOSURE OF INVENTION

Technical Problem

First, the present disclosure is to prevent an internal temperature of a pressure vessel from decreasing when pressure equilibrium is achieved between a distillation tank and the pressure vessel.

Second, the present disclosure is to prevent damage to laundry accommodated inside a pressure vessel by raising a temperature of the pressure vessel.

Third, the present disclosure is to improve a washing performance by increasing a supply temperature of liquid carbon dioxide supplied from a distillation tank to a pressure vessel.

Solution to Problem

In order to solve the above problem, a laundry treating apparatus may further include a pipe and a valve for supplying gaseous carbon dioxide stored in a distillation tank to a pressure vessel before achieving pressure equilibrium. Therefore, before supplying carbon dioxide from the storage tank to the pressure vessel to achieve the pressure equilibrium, it is possible to raise a pressure of the pressure vessel to a preset reference pressure.

Therefore, rather than expanding carbon dioxide to an equilibrium pressure from a pressure lower than an atmospheric pressure, by expanding carbon dioxide from a reference pressure to the equilibrium pressure, it is possible to prevent an excessive decrease in an internal temperature of the pressure vessel.

To this end, a laundry treating apparatus according to the present disclosure includes a pressure vessel for maintaining carbon dioxide accommodated therein at a pressure higher than an atmospheric pressure, a storage tank for storing carbon dioxide therein to supply carbon dioxide to the pressure vessel, a distillation tank for storing carbon dioxide discharged from the pressure vessel to remove foreign substances dissolved in carbon dioxide discharged from the pressure vessel, and a gas supply pipe for connecting the distillation tank and the pressure vessel to each other to supply gaseous carbon dioxide stored in the distillation tank to the pressure vessel.

The laundry treating apparatus may further include a gas supply control valve positioned on the gas supply pipe to open and close the gas supply pipe, and a controller that opens and closes the gas supply pipe by opening and closing the gas supply control valve, and the controller may open the gas supply control valve until an internal pressure of the distillation tank reaches a preset reference pressure.

Before opening the gas supply control valve, the internal pressure of the distillation tank may be higher than the reference pressure, and a pressure of the pressure vessel may be lower than the atmospheric pressure.

An internal temperature of the pressure vessel may increase until reaching the reference pressure.

The gas supply pipe may connect an upper portion of the distillation tank and an upper portion of the pressure vessel to each other to provide a passage for carbon dioxide to flow.

The laundry treating apparatus may further include a pressure sensor for measuring an internal pressure of the pressure vessel, and the controller may be able to sense the internal pressure of the pressure vessel through the pressure sensor.

The laundry treating apparatus may further include a first supply pipe for connecting an upper portion of the storage tank to the pressure vessel to supply gaseous carbon dioxide stored in the storage tank to the pressure vessel, and a first supply control valve located on the first supply pipe to open and close the first supply pipe, and the controller may be able to open and close the first supply pipe through opening and closing of the first supply control valve.

The first supply pipe and the gas supply pipe may form a single combined pipe before being connected to the storage tank, and then the single combined pipe may be connected to the storage tank.

The controller may open the gas supply control valve until the internal pressure of the distillation tank reaches the preset reference pressure before opening the first supply control valve.

The laundry treating apparatus may further include a vacuum pump for discharging air inside the pressure vessel, and the controller may operate the vacuum pump to make the internal pressure of the pressure vessel lower than the atmospheric pressure before opening the gas supply control valve.

The controller may close the gas supply control valve and open the first supply control valve to bring an internal pressure of the storage tank and the internal pressure of the pressure vessel to an equilibrium pressure when the reference pressure is reached.

The laundry treating apparatus may further include a second supply pipe connected to the storage tank and the pressure vessel to supply liquid carbon dioxide stored in the storage tank to the pressure vessel, and a second supply control valve located on the second supply pipe to open and close the second supply pipe, and the controller may open the second supply control valve when the equilibrium pressure is reached to flow liquid carbon dioxide stored in the storage tank to the pressure vessel.

An installation vertical level of the storage tank may be higher than an installation vertical level of the pressure vessel, and an installation vertical level of the distillation tank may be lower than the installation vertical level of the pressure vessel.

The laundry treating apparatus may further include a compressor located outside the distillation tank, sucking gaseous carbon dioxide from the distillation tank, and compressing gaseous carbon dioxide, a heat exchanger located inside the distillation tank and connected to the compressor to perform heat exchange between compressed gaseous carbon dioxide and liquid carbon dioxide stored inside the distillation tank, and a storage pipe for connecting the heat exchanger and the storage tank to each other to flow carbon dioxide cooled through the heat exchanger to the storage tank.

The laundry treating apparatus may further include a suction pipe for connecting the distillation tank and the compressor to each other to flow gaseous carbon dioxide from the distillation tank to the compressor, and a discharge pipe for connecting the compressor and the heat exchanger to each other to flow compressed gaseous carbon dioxide to the heat exchanger.

Advantageous Effects of Invention

First, the present disclosure may prevent the internal temperature of the pressure vessel from decreasing when the pressure equilibrium is achieved between the distillation tank and the pressure vessel.

Second, the present disclosure may prevent the damage to the laundry accommodated inside the pressure vessel by raising the temperature of the pressure vessel.

Third, the present disclosure may improve the washing performance by increasing the supply temperature of liquid carbon dioxide supplied from the distillation tank to the pressure vessel.

BRIEF DESCRIPTION OF DRAWINGS (a) and (b) in FIG. 1 show an example of a laundry treating apparatus described in the present disclosure.

FIG. 2 shows an example of a drum and a driver disposed inside a pressure vessel.

FIG. 3 is a rear view of a partition wall and a driver after separating a second housing from a pressure vessel.

(a) and (b) in FIG. 4 are a front view and a side view of a partition wall, respectively.

FIG. 5 schematically shows components of a conventional laundry treating apparatus using carbon dioxide as a washing solvent.

(a) in FIG. 6 shows an example of a pressurization operation for reaching pressure equilibrium using gaseous carbon dioxide stored in a storage tank during a washing cycle of a conventional laundry treating apparatus. (b) in FIG. 6 shows an example of a replenishment operation using a replenishment tank after a pressurization operation of a laundry treating apparatus of the present disclosure.

(a) in FIG. 7 shows an operation of supplying liquid carbon dioxide to a pressure vessel using a vertical level difference between a storage tank and a pressure vessel after a pressurization operation and a replenishment operation are completed in a conventional laundry treating apparatus. (b) in FIG. 7 is an operation of recovering liquid carbon dioxide inside the pressure vessel by supplying carbon dioxide to the pressure vessel using the vertical level difference between the storage tank and the pressure vessel before proceeding with a rinsing process after washing is complete.

(a) in FIG. 8 shows a distillation operation for distilling liquid carbon dioxide discharged to a distillation tank after a washing operation or a rinsing operation in a conventional laundry treating apparatus. (b) in FIG. 8 shows a recovery operation of recovering gaseous carbon dioxide remaining in a pressure vessel and removing residual gas before completing a washing cycle after the rinsing operation.

FIG. 9 shows an example of supplying gaseous carbon dioxide stored in a distillation tank to a pressure vessel through a gas supply pipe connecting the distillation tank and the pressure vessel to each other.

FIG. 10 shows an example of supplying gaseous carbon dioxide stored in a distillation tank to a pressure vessel through a gas supply pipe, and then pressurizing gaseous carbon dioxide to reach pressure equilibrium using gaseous carbon dioxide stored in a storage tank.

MODE FOR THE INVENTION

Hereinafter, a preferred embodiment of the present disclosure will be described in detail with reference to the accompanying drawings. In one example, a configuration of a device or a method for controlling the same to be described below is only for de-scribing an embodiment of the present disclosure, not for limiting the scope of the present disclosure, and reference numerals used the same throughout the specification refer to the same components.

Specific terms used in this specification are only for convenience of description and are not used as a limitation of the illustrated embodiment.

For example, expressions indicating that things are in the same state, such as "same", "equal", "homogeneous", and the like, not only indicate strictly the same state, but also indicate a state in which a tolerance or a difference in a degree to which the same function is obtained exists.

For example, expressions indicating a relative or absolute arrangement such as "in a certain direction", "along a certain direction", "parallel", "orthogonal", "central", "concentric", "coaxial", or the like not only strictly indicate such arrangement, but also indicate a state in which a relative displacement is achieved with a tolerance, or an angle or a distance that achieves the same function.

In order to describe the present disclosure, the description below will be achieved on the basis of a spatial orthogonal coordinate system with an X-axis, a Y-axis, and a Z-axis orthogonal to each other. Each axial direction (an X-axis direction, a Y-axis direction, or a Z-axis direction) means both directions in which each axis extends. Adding a '+' sign in front of each axial direction (a +X-axis direction, a +Y-axis direction, or a +Z-axis direction) means a positive direction, which is one of the two directions in which each axis extends. Adding a '−' sign in front of each axial direction (a −X-axis direction, a −Y-axis direction, or a −Z-axis direction) means a negative direction, which is the other of the two directions in which each axis extends.

Expressions referring to directions such as "front (+Y)/rear (−Y)/left (+X)/right (−X)/up (+Z)/down (−Z)" to be mentioned below are defined based on a XYZ coordinate axis. However, this is to describe the present disclosure such that the present disclosure may be clearly understood. In one example, each direction may be defined differently depending on the standard.

The use of terms such as 'first, second, third' in front of the components to be mentioned below is only to avoid confusion of the components referred to, and is in-dependent of the order, importance, or master-slave relationship between the components. For example, an invention including only the second component without the first component may also be implemented.

The singular expression includes the plural expression unless the context clearly dictates otherwise.

Hereinafter, the present disclosure is described on the premise that carbon dioxide is used as a washing solvent, but other washing solvents other than the carbon dioxide may be used.

(a) and (b) in FIG. 1 show a laundry treating apparatus 1000 as an example of the present disclosure. Referring to (a) in FIG. 1, the laundry treating apparatus 1000 includes a pressure vessel 200 for maintaining the carbon dioxide contained therein at a pressure higher than an atmospheric pressure, a storage tank 150 that is located above the pressure vessel 200 and stores the carbon dioxide and supplies the carbon dioxide to the pressure vessel 200, and a distiller 400 that is located below the pressure vessel 200 and vaporizes liquid carbon dioxide of the carbon dioxide discharged from the pressure vessel 200 to remove foreign substances therefrom, and then, liquefies the vaporized carbon dioxide and supplies the liquid carbon dioxide to the storage tank 150.

The storage tank 150 being located above the pressure vessel 200 may mean that, when viewed from the front, a vertical height from a bottom surface to a center of a circular cross-section of the storage tank 150 having a cylindrical shape is greater than a vertical height to a center of a circular cross-section of the pressure vessel 200 having a cylindrical shape. This may be interpreted similarly to a distillation tank of the distiller 400, so that a distillation tank 401 may be located below the pressure vessel 200.

That is, a vertical level at which the storage tank 150 is installed may be higher than that of the pressure vessel 200, and a vertical level at which the distillation tank 401 is installed may be lower than that of the pressure vessel 200.

In addition, the laundry treating apparatus 1000 may include a cabinet 100 forming an appearance of the laundry treating apparatus 1000. The pressure vessel 200 may include a drum 300 rotatably disposed inside the pressure vessel 200 and accommodating laundry therein, and a driver 500 for rotating the drum 300.

In addition, the laundry treating apparatus 1000 may further include a frame 110 disposed inside the cabinet 100 for supporting the cabinet and supporting the pressure vessel, the storage tank 150, and the distiller 400.

The laundry treating apparatus 1000 may perform a washing cycle of, after supplying the carbon dioxide to the pressure vessel 200 from the storage tank 150 in response to an input of a user, removing the foreign substances from the laundry using friction between the laundry accommodated in the drum 300 and the liquid carbon dioxide by rotating the drum 300.

The washing cycle refers to a series of operations performed by the laundry treating apparatus 1000 when the user selects a course for washing of the laundry. The washing cycle may include a pressurization operation and a supply operation of supplying the carbon dioxide to the pressure vessel 200 from the storage tank 150, a washing operation of removing the foreign substances from the laundry using the friction between the liquid carbon dioxide and the laundry by rotating the drum 300 at a preset first rotation speed, and a rinsing operation of removing the foreign substances from the laundry using the friction between the liquid carbon dioxide and the laundry by rotating the drum 300 at a preset second rotation speed.

The rinsing operation may be repeated twice. Preferably, inside the pressure vessel (or washing chamber) 200, under conditions of approximately 45 to 51 bar and 10 to 15° C., the washing operation may be performed for 10 to 15 minutes and the rinsing operation may be performed for 3 to 4 minutes.

After the washing operation and the rinsing operation are completed, a distillation operation may be included. The distillation refers to heating a specific liquid mixed with the foreign substances (or pollutants), then vaporizing (or evaporating) only the specific liquid, and then cooling the specific liquid again to separate only a specific pure liquid. In this specification, the distillation refers to an operation of vaporizing the liquid carbon dioxide mixed with the foreign substances removed from the laundry and then cooling the vaporized carbon dioxide to separate only pure liquid carbon dioxide. The separated liquid carbon dioxide may be reused in a next operation after being supplied to the storage tank again.

The cabinet 100 may include a cabinet bottom surface (not shown) that forms a bottom surface of the laundry treating apparatus 1000, a top panel (not shown) that forms a top surface of the cabinet 100, a front panel 103 that forms a front surface of the cabinet 100 and connects the cabinet bottom surface and the top panel to each other, side panels (not shown) that form both side surfaces of the cabinet 100 and connect the cabinet bottom surface and the top panel to each other, and a rear panel (not shown) that forms a rear face of the cabinet.

The front panel 103 may have a cabinet inlet 1031 defined therein through which the laundry may be put into the drum 300 or the laundry accommodated in the drum 300 may be withdrawn to the outside of the cabinet 100. In addition, the laundry treating apparatus 1000 may include a door 130 pivotably disposed on the front panel 103 to open and close the cabinet inlet 1031.

The pressure vessel 200 may be located inside the cabinet 100 to accommodate the carbon dioxide therein. The pressure vessel 200 may include a vessel inlet 219 defined therein capable of being in communication with the cabinet inlet. When the door 130 is closed, not only the cabinet inlet 1031, but also the vessel inlet 219 is closed, so that the pressure vessel 200 may be a pressure vessel or a pressure-resistant vessel capable of accommodating high-pressure carbon dioxide therein.

For example, the carbon dioxide supplied to the pressure vessel 200 may maintain a predetermined pressure to exist as the liquid carbon dioxide. Preferably, the pressure may be a single pressure set in a pressure range from 45 bar to 51 bar.

The drum 300 may be rotatably disposed inside the pressure vessel 200. Specifically, the drum 300 may be rotatably disposed in an inner space of a first housing 211 (see FIG. 2), that is, in a first chamber 210. The drum 300 may include a plurality of side through-holes (not shown) defined in an inner circumferential surface of the drum 300 to allow fluid communication between the pressure vessel 200 and the drum 300. That is, the drum 300 may include a drum body 301 for accommodating the laundry therein, and the plurality of side through-holes (not shown) penetrating a side surface of the drum body.

Through the plurality of side through-holes, the carbon dioxide supplied to the pressure vessel 200, specifically to the first chamber 210 (see FIG. 2) may be introduced into an accommodation space, which is a space in which the laundry is accommodated inside the drum body, or may come out of the accommodation space into a space between the first chamber 210 (see FIG. 7) and the drum 300.

The drum 300 may have a cylindrical shape. Alternatively, the drum body 301 forming an appearance of the drum 300 may have a cylindrical shape.

Therefore, the pressure vessel may perform a role of the washing chamber in which the washing operation and the rinsing operation occur using the drum 300 disposed therein.

Referring to (a) and (b) in FIG. 1, the storage tank 150, the pressure vessel 200, and the distiller 400 may be located in an order of the vertical level in a height direction with respect to the bottom surface of the cabinet. This is to flow the liquid carbon dioxide by gravity even under the same pressure condition. That is, when the storage tank 150 and the pressure vessel 200 communicate with each other even when pressures thereof are the same, the gravity may flow the liquid carbon dioxide from the storage tank 150 to the pressure vessel 200. Similarly, even when pressures of the pressure vessel 200 and the distillation tank 401 of the distiller 400 are the same, the liquid carbon dioxide may be discharged from the pressure vessel 200 to the distillation tank 401 by the gravity based on a vertical level difference.

In addition, considering weights of the storage tank 150, the pressure vessel 200, and the distillation tank 401, and the size of the laundry treating apparatus, it may be preferable for the storage tank 150, the pressure vessel 200, and the distillation tank 401 to be disposed diagonally with respect to the height direction rather than disposed vertically in a straight line in the height direction in terms of weight distribution or miniaturization of the laundry treating apparatus.

Alternatively, as shown in (a) in FIG. 1, the distillation tank 401 and the storage tank 150 may be disposed closer to the other side surface than to one side surface of the cabinet 100.

Referring to (a) and (b) in FIG. 1, although it is shown that the storage tank 150 and the distillation tank 401 among the storage tank 150, the pressure vessel 200, and the distillation tank 401 are located closer to a right side of the cabinet than to a left side of the cabinet when viewed from the front, the storage tank 150 and the distillation tank 401 may be located on a side opposite thereto.

In an empty space remaining after the storage tank 150, the pressure vessel 200, and the distillation tank 401 are disposed, various compressors, an oil separator 295, a controller 900, a heat dissipation fan 299, and various connection pipes may be located. Referring to (b) in FIG. 1, the controller 900 may be located at a rear portion of the cabinet. This is for easy access to the controller 900. However, this is merely an embodiment. The controller 900 may be located on the side surface or the front surface of the cabinet. In FIG. 1, the controller 900 is formed in a shape of a box. A control device such as a programmable logic controller (PLC) may be disposed in the box. Alternatively, the controller 900 may be formed as a PCB including a microcomputer. FIG. 1 shows a state in which the box-like shape is pivotably disposed on the frame 110.

The controller may control the flow of the carbon dioxide by controlling opening and closing of each pipe through various flow rate control valves. In addition, the driver may be controlled to rotate the drum. In addition, the controller may receive the user input and perform the course or a cycle selected by the user based on a preset operation.

This is a result of considering maintenance because the pressure vessel 200 is exposed as the controller 900 is pivoted.

The heat dissipation fan 299 may be disposed to cool a compressor 290 or to maintain air inside the cabinet 100 at a constant temperature. FIG. 1 shows an example in which the heat dissipation fan is located at a rear lower portion of the cabinet, but the heat dissipation fan may be located anywhere as long as the heat dissipation fan is able to cool the compressor 290 and maintain the air inside the cabinet 100 at the constant temperature. The compressor 290 may be used to compress the gaseous carbon dioxide in the distillation operation. Alternatively, heat may be supplied to the pressure vessel 200 using the high-temperature gaseous carbon dioxide compressed in a recovery operation.

The oil separator 295 may be positioned on top of the controller 900. When the controller 900 pivots, the oil separator 295 may pivot together. This is for convenient maintenance of the pressure vessel 200, the storage tank 150, the compressor, and the like of the laundry treating apparatus 1000.

When the carbon dioxide vaporized in the compressor 290 is compressed at high temperature and high pressure, lubricating oil used is mixed with the carbon dioxide. The oil separator 295 is to separate the lubricating oil again. This is because, when the lubricating oil is mixed with the carbon dioxide, the lubricating oil may be mixed with the carbon dioxide used for the washing and contaminate the laundry.

FIG. 2 shows the pressure vessel 200. The pressure vessel 200 may accommodate the carbon dioxide therein at the pressure higher than the atmospheric pressure. This is because the liquid carbon dioxide is required for the washing of the laundry, and the high pressure is essential for the same. The pressure vessel 200 may include the drum 300 and the driver 500 therein.

Specifically, the pressure vessel 200 may include the first housing 211 and a second housing 221 forming an appearance of the pressure vessel. The first housing 211 may form the first chamber 210 which is the space to which the drum 300 for accommodating the laundry is inserted.

The drum 300 may be constructed to be rotatable, so that the liquid carbon dioxide and the laundry will be mixed with each other in the state in which the laundry is accommodated inside the drum 300.

The first housing 211 may have a first opening 213 defined therein that is opened on a side opposite to the vessel inlet 219 defined in a front surface of the first housing 211, that is, a side coupled to the second housing. That is, the first opening 213 may be located on the opposite side of the vessel inlet 219, and may be larger than the vessel inlet 219.

The first housing 211 may be formed in a shape of a cylinder as a whole, and may have the vessel inlet 219 defined therein having a circular shape on one side thereof, and have the first opening 213 defined therein having a circular shape on the other side.

The drum 300 may be formed in a cylindrical shape similar to the shape of the first chamber 210, which is the inner space of the first housing 211. In addition, the drum 300 may rotate in a clockwise or counterclockwise direction inside the first housing 211.

The size of the first opening 213 may be larger than a size of a cross-section of the drum 300 such that an operator or the user may withdraw the drum 300 through the first opening 213 and repair the drum 300. In this connection, the size of the first opening 213 may be greater than a size of a maximum cross-section of the drum 300. Accordingly, the operator or the like may withdraw the drum 300 by opening the first opening 213 after separating the first housing 211 and the second housing 221 from each other. In addition, it is also possible to install the drum 300 inside the first housing 211 through the first opening 213.

The first housing 211 has an inflow pipe (not shown) through which the carbon dioxide is supplied from the storage tank 150 to the first housing 211. The inflow pipe, which is a pipe exposed to the outside of the first housing 211, may flow the carbon dioxide to the interior of the first housing 211, that is, to the first chamber 210 from the storage tank 150.

The first housing 211 may include a filter assembly 350 filtering large foreign substances that do not dissolve in the liquid carbon dioxide when the liquid carbon dioxide used in the first chamber 210 flows to the distiller 400. The filter 350 may be disposed on a lower outer circumferential surface of the first housing 211. The filter 350 may include a filter insertion portion 351 formed to protrude from the cylindrical shape of the first housing 211 in a radial direction to define a space into which a filter may be inserted, and a discharge hole defined through the filter insertion part 351 to discharge the liquid carbon dioxide that has passed through the filter to the distillation tank 401.

The first housing 211 and the distillation tank 401, specifically, the discharge hole 352 and the distillation tank 401 may be connected to each other through a discharge pipe 630 (see FIG. 9).

The first housing 211 may include a first flange 212 formed along the first opening 213. The first flange 212 may extend in the radial direction along the outer circumferential surface of the first housing 211 similarly to the cylindrical shape of the first housing 211. The first flange 212 is disposed evenly along a circumference of the first housing 211 in a direction in which a radius of the first housing 211 increases.

The second housing 221 may be coupled to the first housing 211 to form one pressure vessel 200. In this connection, the interior of the pressure vessel 200 may be divided into the first chamber 210, which is a space in which laundry treatment is performed, and a second chamber 220, which is a space in which the driver 500 providing a driving force for rotating the drum is installed, by a separator 250.

Schematically, the separator 250 may be coupled to the first opening 213 in a disk shape. Therefore, the first chamber 210 of an inner space of the pressure vessel 200 may be formed by the first housing 211 and the separator 250, and the second chamber 220 may be formed by the second housing 221 and the separator 250. The drum 300 may be accommodated in the first chamber 210, and the driver 500 may be accommodated in the second chamber 220. Accordingly, a through-hole for connecting a rotation shaft (not shown) disposed in the driver 500 to the drum 300 may be defined at a center of the separator 250.

The second housing 221 may include a second flange 222 coupled to the first flange 212. The second housing 221 may be formed to have a size similar to that of the cross-section of the first housing 211 to be disposed at the rear of the first housing 211.

The second flange 222 may be coupled to the first flange 212 by a plurality of fastening members, for example, bolts and nuts, to allow an internal pressure to be maintained to be higher than an external atmospheric pressure in a state in which the second housing 221 is fixed to the first housing 211.

The filter capable of filtering the foreign substances is disposed in the filter insertion portion 351 formed in the first housing 211. The filter includes a plurality of small holes, so that, while the foreign substances are not able to pass through the holes, the liquid carbon dioxide may pass through the holes and be discharged to the outside of the first housing 211 through the discharge pipe 630. For example, the filter may be formed in a shape of a mesh.

The pressure vessel may include the separator 250 that closes the first opening 213 and is coupled to the first housing 211. The separator 250 may include a partition wall

251 for separating the first housing and the second housing from each other, a vessel heat exchanger 256 that is supported by the partition wall 251 and is able to exchange heat with the carbon dioxide accommodated in the first chamber 210, and a heat insulating member 259 disposed between the vessel heat exchanger 256 and the partition wall 251. The heat insulating member 259 is to prevent the heat of the vessel heat exchanger 256 from being transferred to the second chamber 220 through the partition wall 251.

Both the vessel heat exchanger 256 and the heat insulating member 259 may also be coupled to and supported by the partition wall 251, and the vessel heat exchanger 256 and the heat insulating member 259 may be located in the first chamber 210. On the other hand, the driver 500 may be located on the opposite side of the drum 300, that is, in the second chamber 220.

The reason for supplying the heat to the first chamber 210 or the drum 300 through the vessel heat exchanger 256 is to prevent the laundry from being hardened or damaged by a sudden drop in temperature when discharging the liquid carbon dioxide from the first chamber 210 or when discharging the gaseous carbon dioxide.

A main body of the vessel heat exchanger may be in a form of a pipe connected to meander. This is to widen a contact area with the carbon dioxide accommodated in the first chamber 210 as much as possible.

In addition, the vessel heat exchanger 256 may include a central through-portion (not shown) into which the rotation shaft of the driver 500 is inserted and passes corresponding to a size of a first through-hole 2511 (see FIG. 4) to be described later. Accordingly, the heat exchanger may be schematically formed in a donut shape. This is also the case for the heat insulating member. This is because the rotation shaft of the driver 500 passes through the separator 250 and then is connected to the drum 300.

The vessel heat exchanger 256 may operate in a scheme of supplying the heat while a refrigerant circulates, but may also use an electric heater.

FIGS. 2 and 3 show a state in which the partition wall 251 is coupled to the first housing 211, but the separator 250 may be coupled to the second housing 221.

The separator 250 may block the flow of the liquid carbon dioxide of the carbon dioxide stored in the first chamber 210 to the second chamber 220. On the other hand, the gaseous carbon dioxide of the carbon dioxide stored in the first chamber 210 may flow through the separator 250 freely. This is to reduce a stress on the partition wall by balancing a pressure between the first chamber 210 and the second chamber 220.

That is, when the high-pressure carbon dioxide is accommodated in the first chamber 210 and the second chamber is maintained at the atmospheric pressure, or the pressure of the first chamber 210 is reduced from the high pressure to the atmospheric pressure or increased from the atmospheric pressure to the high pressure, the partition wall 251 may be stressed by a pressure difference, which may cause destruction due to fatigue or deformation due to stress of the partition wall 251. To prevent this, the partition wall 251 allows the gaseous carbon dioxide to flow freely but does not allow the liquid carbon dioxide to flow freely to prevent the liquid carbon dioxide from being filled in an unnecessary portion and being wasted while maintaining the pressure difference.

To this end, a graphite gasket (not shown) may be disposed between the partition wall 251 and a seating groove 2122 to which the partition wall is coupled. In addition, all through-holes defined in the partition wall, which will be described later, may be sealed except for a second through-hole. This is to prevent the flow of the liquid carbon dioxide while allowing the gaseous carbon dioxide to flow freely.

At least one second through-hole 2512 (see FIG. 4) may be defined at an upper end of the partition wall where the liquid carbon dioxide does not reach. Therefore, the flow of the gaseous carbon dioxide is possible, so that it is possible to maintain the pressure equalization between the left and right spaces. After all, because there is no pressure difference between the first chamber 210 and the second chamber 220, the graphite gasket does not need to block the flow of the liquid carbon dioxide resulted from the pressure and simply blocks the flow by gravity, so that an excessive fastening force may not be required for the graphite gasket.

Based on FIG. 2, in the space on the left side of the partition wall 251, in the first chamber 210, the drum 300 is disposed, so that the laundry and the liquid carbon dioxide may be mixed with each other to perform the laundry treatment such as the washing operation, the rinsing operation, or the like. On the other hand, in the space on the right side of the partition wall 251, the driver 500 may be disposed to provide the driving force for rotating the drum 300. In this connection, a portion of the driver 500 may penetrate the partition wall 251 to be coupled to the drum 300.

The partition wall 251 may be formed to be larger than the first opening 213 and may be disposed to be in contact with the first opening 213 to seal the first opening 213. The partition wall 251 and the first opening 213 are formed in an approximately circular shape similar to the shape of the first housing 211. A diameter L of the first opening 213 is smaller than a diameter of the partition wall 251. The diameter L of the first opening 213 is larger than a diameter of the drum 300. Accordingly, the size of the cross-section of the drum 300 is the smallest, a cross-section of the first opening 213 has a middle size, and the size of the partition wall 251 is the largest.

The partition wall 251 is constructed to have a plurality of steps, so that strength may be secured.

The seating groove 2122 to which the partition wall 251 is coupled may be defined in the first flange 212 along the first opening 213. That is, the seating groove 2122 may be defined at a portion extended in the radial direction from the first opening 213. The seating groove 2122 may be recessed by a depth equal to greater than a thickness of the partition wall 251, so that the first flange 212 and the second flange 222 may be in contact with each other. When the seating groove 2122 is defined to be recessed by the thickness of the partition wall 251 and to have a shape corresponding to a shape of an outer circumferential surface of the partition wall 251, it may be possible to flatten a surface of the first flange 212 when the partition wall 251 is seated in the seating groove 2122.

A first seating surface 2124 extending in the radial direction further than a circumference of the seating groove 2122 is disposed in the first flange 212, and a second seating surface (not shown) in surface contact with and coupled to the first seating surface 2124 is disposed in the second flange 222. The first seating surface 2124 and the second seating surface are disposed to be in contact with each other, so that the carbon dioxide injected into the inner space of the first housing 211 is prevented from being discharged to the outside. The first seating surface 2124 and the second seating surface may be respectively disposed on outer circumferential surfaces of the first housing 211 and the second housing 221 to provide a coupling surface where the two housings may be coupled to each other by a fastening member while being in surface contact with each other.

The vessel heat exchanger 256 from which the refrigerant flows into the first chamber 210 in which the drum is accommodated may be disposed on the partition wall 251, and the vessel heat exchanger 256 may be disposed in the space defined by the first housing 211 and the partition wall 251. It is possible to increase the temperature of the first chamber 210 through the vessel heat exchanger 256, which is to prevent the laundry accommodated in the drum 300 from being hardened or damaged by a sudden drop in temperature of the first chamber 210 when discharging the liquid carbon dioxide from the first chamber 210 to the distillation tank 401 or when recovering the gaseous carbon dioxide or discharging the gaseous carbon dioxide to the outside.

The heat insulating member 259 may be disposed between the vessel heat exchanger 256 and the partition wall 251. The heat insulating member 259 is to block transfer of the temperature of the vessel heat exchanger 256 to the partition wall 251 to increase a heat exchange efficiency of the vessel heat exchanger 256.

The heat insulating member 259 reduces an influence of the temperature change of the vessel heat exchanger 256 on the partition wall 251. The heat insulating member 259 may be formed similarly to the vessel heat exchanger 256 so as to cover an entire area of the vessel heat exchanger 256.

FIG. 3 shows a state in which the second housing is separated from the first housing in FIG. 2.

When the second housing 221 is separated from the first housing 211, the partition wall 251 will be exposed to the outside. Because the partition wall 251 is coupled to the seating groove of the first housing 211, even when the second housing 221 is separated from the first housing 211, the inner space of the first housing 211 will not be exposed to the outside. The partition wall 251 may include a plurality of third through-holes 2513. Therefore, the partition wall may be coupled to the first housing 211 by a plurality of fastening members, for example, bolts.

The partition wall 251 may be coupled to the driver 500 through the first through-hole 2511 (see FIG. 4) defined at the center of the partition wall 251, and at least one second through-hole 2512 is defined above the driver 500. Each of refrigerant pipes 2567 and 2568 for circulating the refrigerant to transfer the heat through the vessel heat exchanger 256 may pass through the at least one second through-hole 2512.

FIG. 3 shows the two second through-holes 2512 through which the first pipe 2567 and the second pipe 2568 respectively pass, but this is only an example. The first pipe 2567 and the second pipe 2568 may pass through one second through-hole. The first pipe 2567 and the second pipe 2568 will be connected to the vessel heat exchanger 256 to circulate the refrigerant. That is, when the refrigerant flows into the first pipe 2567, the refrigerant will flow out through the second pipe 2568.

In this connection, the refrigerant may be the gaseous carbon dioxide compressed through the compressor 290 rather than a separate refrigerant. Because the gaseous carbon dioxide compressed for the distillation is in a high-temperature and high-pressure state, the gaseous carbon dioxide may be used to raise an internal temperature of the pressure vessel 200 through the vessel heat exchanger 256 disposed inside the pressure vessel 200.

After the high-temperature refrigerant is supplied through the first pipe 2567 and exchanges the heat with the carbon dioxide inside the first chamber 210 through the vessel heat exchanger 256, the cooled refrigerant will be discharged through the second pipe 2568.

When the partition wall 251 is separated from the first housing 211, the first opening 213 will be exposed. In this connection, the drum 300 may be withdrawn to the outside through the first opening 213. Because the size of the first opening 213 is larger than the size of the drum 300, maintenance of the drum 300 is possible through the first opening 213.

A gasket (not shown) is disposed between the partition wall 251 and the seating groove 2122. Accordingly, when the partition wall 251 is coupled to the first housing 211, it is possible to prevent the carbon dioxide from leaking to the space between the partition wall 251 and the seating groove 2122. When the partition wall 251 is seated in the seating groove 2122, the partition wall 251 may be coupled to the seating groove 2122 by a plurality of fastening members while pressing the gasket. The plurality of third through-holes 2513 (see FIG. 4) for coupling to the first housing 211 may be evenly defined in the partition wall 251 along an outer circumferential surface of the partition wall 251.

In addition, the partition wall 251 may be coupled to the driver 500 to support the driver 500. Because the rotation shaft of the driver 500 passes through the separator 250 and is connected to the drum 300, the partition wall may eventually serve to support both the drum 300 and the driver 500.

(a) and (b) in FIG. 4 are views of the partition wall 251 viewed from the front and the side, respectively.

Referring to (a) in FIG. 4, the first through-hole 2511 through which the rotation shaft of the driver 500 passes to be coupled with the drum 300 may be defined at the center of the partition wall 251. The first through-hole 2511 may have a circular shape, so that interference thereof with the rotation shaft passing through the first through-hole 2511 may be prevented.

In addition, the partition wall 251 may further include the at least one second through-hole 2512 for allowing the gaseous carbon dioxide to freely flow between the first chamber 210 and the second chamber 220. The at least one second through-hole 2512 may be defined at a higher position than the first through-hole 2511. A maximum liquid level of the liquid carbon dioxide is lower than a vertical level at which the at least one second through-hole 2512 is located with respect to the bottom surface, so that the liquid carbon dioxide may be prevented from flowing through the at least one second through-hole 2512.

Normally, an amount of liquid carbon dioxide used in the washing operation or the rinsing operation does not exceed half of the drum 300. That is, the liquid carbon dioxide does not flow up to a vertical level equal to or higher than a vertical level of the rotation shaft of the driver 500 coupled to the drum 300, that is, a minimum vertical level of the first through-hole with respect to the bottom surface (a vertical level of a center of the first through-hole−a radius of the first through-hole).

Therefore, when the second through-hole 2512 is located at the higher position than the first through-hole 2511, no liquid carbon dioxide will flow through the second through-hole 2512. On the other hand, because the gaseous carbon dioxide is filled in the space defined by the first housing 211 and the partition wall 251, the gaseous carbon dioxide may freely flow into the space defined by the second housing 221 and the partition wall 251 to achieve the pressure equalization.

That is, while the laundry treatment such as the washing operation or the rinsing operation is performed, in the space partitioned by the first housing 211 and the partition wall 251, the gaseous carbon dioxide and the liquid carbon dioxide are mixed. On the other hand, in the space partitioned by the second housing 221 and the partition wall 251, the liquid carbon dioxide does not exist and only the gaseous carbon dioxide exists. Because the two spaces are in the state of pressure equilibrium, the liquid carbon dioxide may not need to exist in the space defined by the second housing 221 and the partition wall 251, and an amount of liquid carbon dioxide used may be reduced.

Therefore, the total amount of carbon dioxide used for the washing operation, the rinsing operation, or the like may be reduced, so that the amount of carbon dioxide used is reduced compared to that in the prior art. This will reduce an amount of carbon dioxide that has to be reprocessed after the use.

As the amount of carbon dioxide used is reduced, a capacity of the tank for storing the carbon dioxide may be reduced, as well as an overall size of the washing machine for using the carbon dioxide. In addition, because an amount of carbon dioxide that has to be distilled after the use is reduced, a time it takes for the washing cycle may be reduced.

In addition, the refrigerant pipes 2567 and 2568 may pass through the at least one second through-hole 2512 as described above. Accordingly, the size of the at least one second through-hole 2512 may be larger than outer diameters of the refrigerant pipes 2567 and 2568.

The partition wall 251 is a part that may be separated from the first housing 211 or the second housing 221. The vessel heat exchanger 256, the heat insulating member 259, and the driver 500 may be coupled to and supported by the partition wall 251. In order to couple the vessel heat exchanger 256 and the heat insulating member 259 to the partition wall 251, a plurality of fourth through-holes 2514 through which the fastening member passes may be defined in a radial direction of the first through-hole 2511.

(a) in FIG. 4 shows a state in which the plurality of fourth through-holes 2514 are paired by two and the three pairs are arranged at spacings of 120° (degrees), but this is only one embodiment. The shape and the arrangement of the fourth through-holes 2514 are not limited as long as the fourth through-holes 2514 are able to support the vessel heat exchanger 256 and the heat insulating member 259 by coupling the vessel heat exchanger 256 and the heat insulating member 259 to the partition wall 251.

In addition, when the partition wall 251 is separated from the first housing 211, it is possible to provide an environment in which the user or the like may separate the drum 300 from the first housing 211.

The partition wall 251 may be stepped forwardly or rearwardly a plurality of times, and strength thereof may be increased. In addition, the partition wall 251 may have a curved surface in some sections, so that the partition wall 251 may be formed to withstand forces in various directions.

An outermost portion of the partition wall 251 may have a shape coupled to the seating groove 2122 of the first housing 211. In addition, the partition wall 251 may include the plurality of third through-holes 2513 in a portion corresponding to the seating groove 2122 to be coupled to the first housing 211 using the fastening member after being coupled to the seating groove 2122.

Based on (b) in FIG. 4, in a direction from the outermost portion of the partition wall 251 to a central portion, the partition wall 251 may be stepped by various lengths in various directions, such as protruding leftwards, then protruding rightwards, and then protruding leftwards again, so that the strength may be increased.

FIGS. 5 to 8 schematically show a flow path of the carbon dioxide in a main stage of forming the washing cycle in order to illustrate the washing cycle of the conventional laundry treating apparatus using the carbon dioxide as the washing solvent.

Referring to FIG. 5, the laundry treating apparatus using the carbon dioxide as the washing solvent may include the pressure vessel 200 that accommodates the laundry therein and performs the washing and the rinsing using the supplied carbon dioxide, the storage tank 150 that stores the used carbon dioxide after the distillation and supplies the carbon dioxide to the pressure vessel (or the washing chamber) 200, and the distiller 400 that distills the carbon dioxide emitted after the use.

The pressure vessel 200 may further include the filter assembly 350 for removing the foreign substances insoluble in the liquid carbon dioxide discharged after the use. As described above, the filter assembly 350 may be disposed on the lower surface of the pressure vessel 200. However, the present drawing illustrates an example in which the filter assembly 350 is independently disposed between the pressure vessel 200 and the distiller 400.

In addition, the laundry treating apparatus may further include a replenishment tank 155 for supplying carbon dioxide to replenish the carbon dioxide lacking in the pressure vessel 200.

The distiller 400 is to remove the foreign substances from the carbon dioxide used in the washing operation and the rinsing operation, that is, the carbon dioxide used in the pressure vessel, and then distill the carbon dioxide for the reuse. As described above, in order to remove the foreign substances from the liquid carbon dioxide, particularly foreign substances dissolved in the liquid carbon dioxide, only the liquid carbon dioxide should be vaporized and then cooled again.

To this end, the conventional distiller 400 may include the distillation tank 401 for storing the carbon dioxide discharged from the pressure vessel, the compressor 290 located outside the distillation tank 401 and sucking and compressing the gaseous carbon dioxide from the distillation tank 401, and a heat exchanger 410 located inside the distillation tank 401 and connected to the compressor 290 to exchange the heat of the compressed gaseous carbon dioxide with the liquid carbon dioxide stored inside the distillation tank 401.

The conventional distiller 400 may further include a cooler 160 for liquefying the distilled carbon dioxide.

In addition, the conventional laundry treating apparatus may further include a plurality of pipes for connecting components with each other and a plurality of valves or a controller for controlling the flow of the carbon dioxide along the plurality of pipes. This is described using FIGS. 9 and 10. FIG. 5 schematically shows each component, so that the plurality of valves or the controller is omitted, and the plurality of pipes are indicated by lines. In addition, a flow direction of the carbon dioxide is indicated by an arrow.

A triple point of the carbon dioxide (CO2) is known to be 5.1 atm and −56.6° C. Therefore, a phase change from a solid (dry ice) to a gas occurs when the temperature is changed under a pressure lower than the triple point, whereas, under a pressure higher than the triple point, the carbon dioxide exists as a liquid and a gas, so that a phase change between a liquid and a gas may occur depending on given pressure and temperature.

Therefore, when the carbon dioxide is pressurized, like using water as the washing solvent in a general laundry treating apparatus, the liquid carbon dioxide (CO2(L) or L-CO2) may be used as the washing solvent. However, in a case of a water-soluble substance, washing power using the carbon dioxide is low, so that a detergent or a surfactant may be additionally used to remove water-soluble substances.

A fluid other than the carbon dioxide may be used as the washing solvent. The fluid may be a fluid whose phase change from a gas to a liquid occurs or that may be in a state of supercritical fluid when pressurized at a predetermined temperature.

When the carbon dioxide is used as the washing solvent, all of the carbon dioxide evaporates into gas when a pressure thereof is reduced to the atmospheric pressure after the washing cycle is completed. Therefore, there is no need to go through a separate drying cycle that requires a long time, and there is no odor even when there is residual carbon dioxide. However, because the carbon dioxide is used by being pressurized, unlike a tub of the general laundry treating apparatus, a sealed pressure vessel is required to prevent the carbon dioxide from leaking.

Therefore, the pressure vessel 200 is an airtight container from which the pressurized carbon dioxide is not able to escape, and must be formed as a tank that may withstand the pressure of the pressurized carbon dioxide. This is also true for the storage tank 150, the replenishment tank 155, and the distillation tank 401.

FIGS. 6 to 8 show major stages of the washing cycle of the conventional laundry treating apparatus using the carbon dioxide as the washing solvent.

(a) in FIG. 6 shows the pressurization operation prior to the washing process or the washing operation in the washing cycle of the conventional laundry treating apparatus using the carbon dioxide as the washing solvent.

When the user selects the washing cycle described above, prior to the pressurization operation, the controller 900 may open a purge valve 298 disposed in the pressure vessel, and remove the air inside the pressure vessel 200 using a vacuum pump (not shown). This is because the washing power of the carbon dioxide for the laundry may be reduced when the air remains in the pressure vessel and contains moisture.

In addition, the pressure inside the pressure vessel 200 may be lower to a pressure lower than the atmospheric pressure, preferably close to vacuum, by discharging the residual air remaining after opening of the purge valve 298 using a pump (not shown).

Thereafter, a top of the storage tank 150 may be opened to supply the gaseous carbon dioxide to the pressure vessel 200 to pressurize the pressure vessel 200. Because the internal pressure of the storage tank 150 is higher than the internal pressure of the pressure vessel 200, the gaseous carbon dioxide will flow from the storage tank 150 to the pressure vessel until the internal pressure of the storage tank 150 is equal to the internal pressure of the pressure vessel 200.

Accordingly, the pressurization operation will continue until the pressures of the storage tank 150 and the pressure vessel 200 are in equilibrium. In this connection, when the pressure vessel 200 is divided into the first chamber 210 and the second chamber 220 by the separator 250 as described above, the liquid carbon dioxide and the gaseous carbon dioxide will coexist in phase equilibrium in the first chamber 210, and the second chamber 220 will be filled with the gaseous carbon dioxide having the same pressure as that of the first chamber 210.

In the storage tank 150, carbon dioxide used in a previous washing cycle may be distilled and stored. The storage tank 150 is also the tank capable of withstanding the high pressure. In the storage tank 150, a portion of the carbon dioxide which may be stored as the gaseous carbon dioxide and the rest may be stored as the liquid carbon dioxide. Therefore, the carbon dioxide may be supplied to the pressure vessel 200 by opening the top of the storage tank 150.

In this connection, the storage tank 150 and the pressure vessel 200 will supply the carbon dioxide to the pressure vessel 200 until the pressure equilibrium is achieved. Therefore, the pressure in the storage tank 150 will decrease, which in turn will decrease the temperature. In the storage tank 150, the gaseous carbon dioxide and the liquid carbon dioxide coexist. When the liquid carbon dioxide is put into the pressure vessel 200 whose pressure is close to the vacuum, the temperature will drop rapidly as all of the liquid carbon dioxide vaporizes, so that the laundry may be damaged. To prevent this, the gaseous carbon dioxide may be injected first.

(b) in FIG. 6 shows the replenishment operation of replenishing the carbon dioxide lacking after the pressurization operation. Even when the liquid carbon dioxide used in the washing and rinsing operations is distilled and used again as the carbon dioxide used in the washing cycle, when considering slight loss or the like caused by opening the purge valve 298 at the beginning of the washing cycle and discharging the residual carbon dioxide to the outside after the washing cycle, the amount of carbon dioxide stored inside the laundry treating apparatus will be gradually reduced. Therefore, it is necessary to supplement the carbon dioxide, so that the replenishment tank 155 may be further disposed. The liquid carbon dioxide is filled in the replenishment tank 155, and is able to be supplied to the pressure vessel 200.

(a) in FIG. 7 shows the supply operation of supplying the carbon dioxide to the pressure vessel 200 using the vertical level difference between the storage tank 150 and the pressure vessel after the pressurization and the replenishment operations are completed.

After the pressurization and the replenishment operations are completed, the pressure vessel 200 will maintain a predetermined pressure, for example 50 bar. In this connection, in the pressure vessel 200, the liquid carbon dioxide and the gaseous carbon dioxide will coexist in the phase equilibrium. However, in order to secure sufficient the liquid carbon dioxide for the washing, a bottom of the storage tank 150 is opened to supply the liquid carbon dioxide. In this connection, the liquid carbon dioxide may be supplied by the vertical level difference between the pressure vessel 200 and the storage tank 150 rather than the pressure. To this end, the storage tank 150 may be located above the pressure vessel 200 with respect to the bottom surface.

Alternatively, the installation vertical level of the storage tank 150 may be higher than the installation vertical level of the pressure vessel 200. That is, the vertical level of the center of the circular cross-section of the storage tank 150 with respect to the bottom surface of the cabinet may be higher than the vertical level of the center of the circular cross-section of the pressure vessel 200.

In addition, the gaseous carbon dioxide communicates between the upper portion of the storage tank 150 and the pressure vessel 200. This is indicated by a double-headed arrow on the flow path of the carbon dioxide in (a) in FIG. 7.

When the liquid carbon dioxide is filled to a predetermined vertical level inside the pressure vessel 200 in the supply operation, the controller 900 may rotate the drum 300 at the preset first rotation speed to proceed with the washing operation. The liquid level of the liquid carbon dioxide may allow that the liquid carbon dioxide of a preset flow rate may be supplied to the pressure vessel 200 using a liquid level sensor or by the controller 900 controlling the valve for a preset time.

(b) in FIG. 7 shows a rinsing preparation operation, after the washing is complete and before performing the rinsing, of supplying the carbon dioxide to the pressure vessel 200 using the vertical level difference between the storage tank 150 and the pressure vessel 200 to recover the liquid carbon dioxide inside the pressure vessel 200.

As described above, the foreign substances insoluble in the liquid carbon dioxide may be filtered through the filter assembly 350, and the foreign substances dissolved in the liquid carbon dioxide are removed through the distillation through the distiller 400, so that only the purified liquid carbon dioxide may be obtained for the reuse.

The liquid carbon dioxide discharged from the pressure vessel 200 will be discharged to the distillation tank 401 by the vertical level difference between the pressure vessel 200 and the distillation tank 401, not the pressure difference. To this end, the distillation tank 401 may be located below the pressure vessel 200 with respect to the bottom surface. In addition, this is to prevent unnecessary energy wastage during the flow of the liquid carbon dioxide.

In this connection, for pressure equilibrium of the components, the storage tank 150, the distillation tank, and the pressure vessel 200 are in communication with each other, so that the gaseous carbon dioxide may freely flow between the storage tank 150, the distillation tank, and the pressure vessel 200. This is indicated by double-headed arrows on the flow path of the carbon dioxide.

The liquid carbon dioxide discharged after the use from the pressure vessel 200 fills the distillation tank 401. Instead of the discharged liquid carbon dioxide, clean liquid carbon dioxide supplied from the bottom of the storage tank 150 will fill the empty space in the pressure vessel 200. This is for the subsequent rinsing operation. The rinsing preparation operation and the rinsing operation may be repeated a plurality of times. For example, the rinsing preparation operation and the rinsing operation may be repeated twice.

(a) in FIG. 8 shows the distillation operation, between the washing operation and the rinsing operation, between the rinsing operation and another rinsing operation, or after both the washing operation and the rinsing operation are complete, of distilling the liquid carbon dioxide discharged from the pressure vessel 200 to the distillation tank 401 in the conventional laundry treating apparatus using the carbon dioxide as the washing solvent.

After the rinsing preparation operation, the controller 900 performs the rinsing operation of removing the remaining foreign substances by rotating the drum 300 at a preset second rotation speed.

During the washing operation or the rinsing operation, or after the rinsing operation is completed, the distillation of the carbon dioxide may be performed in the distiller 400.

The distiller 400 may include the distillation compressor 290 located outside the distillation tank 401 and sucking and compressing the gaseous carbon dioxide of the carbon dioxide stored in the distillation tank 401, the heat exchanger 410 located inside the distillation tank 401 and connected to the distillation compressor 290 to exchange the heat of the compressed gaseous carbon dioxide with the liquid carbon dioxide stored in the distillation tank 401, and a storage pipe 610 for flowing the carbon dioxide past the heat exchanger 410 to the storage tank.

In addition, the distillation compressor 290 may be connected to the distillation tank 401 through a compression pipe 640. The compression pipe 640 may include a suction pipe 641 that connects the distillation tank 401 and the distillation compressor 290 to each other to transfer the gaseous carbon dioxide stored in the distillation tank 401 to the distillation compressor 290, and a discharge pipe 651 that connects the distillation compressor 290 and the heat exchanger 410 to each other to discharge the gaseous carbon dioxide compressed at the high temperature and the high pressure to the heat exchanger 410.

The distillation compressor 290 may be a general compressor capable of compressing the gaseous carbon dioxide. In addition, the heat exchanger 410 may be in a form of increasing an area of contact with liquid carbon dioxide as the pipe is meandering.

The liquid carbon dioxide and the gaseous carbon dioxide stored in the distillation tank 401 will be in the phase equilibrium. Only the liquid carbon dioxide is in the state of being mixed with the foreign substances, and the gaseous carbon dioxide exists with no foreign substances because the foreign substances are not vaporized.

Because the pressure inside the distillation tank 401 distills the carbon dioxide stored in the distillation tank 401 and continuously flows the carbon dioxide to the storage tank 150, as the distillation progresses, the pressure inside the distillation tank 401 may be lowered. That is, when the compressor 290 operates, the pressure inside the distillation tank 401 will drop by a suction power of the compressor 290. Accordingly, the vaporization of the liquid carbon dioxide will proceed. Therefore, in general, the internal pressure of the distillation tank 401 will be lower than the internal pressure of the storage tank 150. Therefore, in order to transfer the carbon dioxide to the storage tank 150, it must be compressed to have the internal pressure equal to or higher than the internal pressure of the storage tank 150. The compressor 290 may be required for this.

The heat exchanger 410 is for the heat exchange between the compressed gaseous carbon dioxide and the liquid carbon dioxide accommodated in the distillation tank. Because the compressed gaseous carbon dioxide is in the high-temperature and high-pressure state, the gaseous carbon dioxide may be stored in the storage tank 150 after lowering the temperature thereof. Preferably, the gaseous carbon dioxide may be stored after changing the phase to the liquid carbon dioxide by lowering the temperature.

To this end, in terms of energy efficiency, it is preferable to use the heat of the compressed gaseous carbon dioxide for the evaporation of the liquid carbon dioxide stored in the distillation tank rather than cooling using a separate cooler, so that the heat exchanger 410 as described above may be used.

In addition, in the distiller 400, the storage pipe 610 that connects the heat exchanger 410 and the storage tank 150 to each other to flow the carbon dioxide that has passed through the heat exchanger 410 to the storage tank 150 may further include the cooler 160 for cooling the flowing carbon dioxide.

As such, the liquid carbon dioxide mixed with the foreign substances is vaporized through the distiller 400 to remove the foreign substances therefrom. In this connection, a necessary vaporization heat is obtained through the heat exchange with the already vaporized and compressed gaseous carbon dioxide.

However, in the process of using the compressor 290, oil for smooth operation of the compressor 290 may be used. This eventually mixes with the compressed gaseous carbon dioxide, so that the distiller 400 may further include an oil separator 295 (see FIG. 1) for separating the oil from the compressed gaseous carbon dioxide on the storage pipe 610.

(b) in FIG. 8 shows the recovery operation of recovering the gaseous carbon dioxide remaining in the pressure vessel 200 after discharging the liquid carbon dioxide stored in the pressure vessel 200 for the distillation after all the washing and rinsing operations are completed.

The distillation methods are all the same, but a difference exists for recovering and reusing the gaseous carbon dioxide as much as possible because the gaseous carbon dioxide does not need to remain in the pressure vessel 200 anymore after the rinsing operation is completed.

(b) in FIG. 8 shows a recovery operation of recovering the gaseous carbon dioxide remaining in the pressure vessel 200 and removing residual gas before completing the washing cycle after the rinsing operation.

As described above, the distillation operation refers to the operation of vaporizing the liquid carbon dioxide in the pressure vessel 200 to remove the foreign substances, and then storing the purified liquid carbon dioxide in the storage tank. In contrast, the recovery operation refers to the operation of recovering the gaseous carbon dioxide present in the pressure vessel 200 and storing the gaseous carbon dioxide in the storage tank 150 after the compression. This is because there is no need for the gaseous carbon dioxide to pass through the filter or go through the complicated distillation operation as the gaseous carbon dioxide does not mix with the foreign substances.

The distillation compressor 290 may be used not only in the distillation operation, but also in the recovery operation. That is, in order to transfer the heat through the vessel heat exchanger 256 disposed between the partition wall 251 and the drum 300 inside the first chamber 210, the separate refrigerant may be used, but the gaseous carbon dioxide compressed through the compressor 290 may be used as the refrigerant. This is possible by simply opening and closing the connection pipe without using the separate compressor that takes up a lot of space to compress the refrigerant.

Unlike in the distillation operation, the carbon dioxide compressed in the compressor 290 may pass through the vessel heat exchanger 256, then is liquefied by passing through the cooler 160, and then, stored in the storage tank 150. Such flow path of the carbon dioxide may be adjusted based on the opening and closing of the connection pipe and the valve (not shown).

The reason the gaseous carbon dioxide inside the pressure vessel 200 passes through the vessel heat exchanger 256 after being compressed through the compressor 290 is that, when the pressure of the pressure vessel 200 drops and accordingly the temperature drops as the gaseous carbon dioxide is recovered, the gaseous carbon dioxide that has not been recovered yet is liquefied, which may damage the laundry. This is to maintain the temperature in the pressure vessel 200 at the preset temperature in the recovery operation to prevent the above situation.

In addition, when the pressure inside the pressure vessel 200 goes down to a certain pressure, for example, a pressure equal to or lower than 1.5 bar, the purge valve 298 will be finally opened to discharge the remaining gaseous carbon dioxide. This may result in a small loss of the carbon dioxide supplied during the washing cycle in the storage tank. Therefore, as described above, the replenishment tank 155 may be required to replenish the lacking carbon dioxide in a next washing cycle.

In the case of the conventional laundry treating apparatus using the carbon dioxide as the washing solvent described using FIGS. 5 to 8, as the amount of carbon dioxide stored in the storage tank 150, an amount of carbon dioxide needed for the rinsing operation that generally requires the greatest amount of liquid carbon dioxide may be stored. Because the rinsing operation may be generally repeated twice, an amount required for the two rinsing operations may be stored.

However, this eventually increases a size and a weight of the storage tank 150, so that there is a problem in miniaturization of the laundry treating apparatus. To solve this, in order to reduce the amount of carbon dioxide stored in the storage tank 150, after reducing the amount of carbon dioxide based on an operation that requires a larger amount among the washing operation or the one rinsing operation, the carbon dioxide may be distilled and reused in the washing operation or the rinsing operation.

When reducing the size of the storage tank 150 to reduce the amount of carbon dioxide stored in the storage tank 150, the temperature of the storage tank 150 may be very low when the gaseous carbon dioxide stored in the storage tank 150 is supplied to the pressure vessel 200 in the pressurization operation to reach the pressure equilibrium state. This is because, when the storage tank 150 reaches the equilibrium pressure from an initial internal pressure (or an initial pressure) of the storage tank 150 before supplying the gaseous carbon dioxide to the pressure vessel 200, similar to adiabatic expansion, a rapid decrease in the temperature occurs by the pressure drop. Compared to the case of the conventional laundry treating apparatus having a large-capacity storage tank 150, the temperature of the storage tank 150 may be further reduced when the size of the storage tank 150 is reduced.

The rapid temperature decrease of the storage tank 150 means that the temperature of the liquid carbon dioxide stored in the storage tank 150 also decreases rapidly. After completion of the pressurization operation and the replenishment operation, when the liquid carbon dioxide is supplied to the pressure vessel 200 using the vertical level difference with the storage tank 150, because of the low temperature of the liquid carbon dioxide, the laundry accommodated in the drum 300 may be frozen hard, reducing the washing performance or damaging the laundry. In addition, the low temperature may decrease a surface tension of the liquid carbon dioxide, thereby reducing the washing performance.

FIG. 9 schematically shows a laundry treating apparatus including a gas supply pipe 690 for supplying the gaseous carbon dioxide stored in the distillation tub to the pressure vessel 200 prior to the pressurization operation in order to solve the above problems.

In order to describe a process of flowing the gaseous carbon dioxide stored in the distillation tank 401 to the pressure vessel 200 using the gas supply pipe 690, unnecessary components are omitted.

Referring to FIG. 9, the laundry treating apparatus 1000 described in the present disclosure includes the pressure vessel 200 that maintains the carbon dioxide accommodated therein at the pressure higher than the atmospheric pressure, the storage tank 150 located above the pressure vessel 200 to store the carbon dioxide and supply the carbon dioxide to the pressure vessel 200, and the distiller 400 that is located below the pressure vessel 200, vaporizes the liquid carbon dioxide of the carbon dioxide discharged from the pressure vessel 200 to remove the foreign substances therefrom, and then liquefies the vaporized carbon dioxide and supplies the liquefied carbon dioxide to the storage tank 150.

In addition, the laundry treating apparatus 1000 may further include the cabinet 100 that includes the pressure vessel 200, the storage tank 150, and the distiller 400 therein, and forms an appearance of the laundry treating apparatus.

In addition, in the distiller 400, the storage pipe 610 that connects the heat exchanger 410 and the storage tank 150 to each other to flow the carbon dioxide that has passed through the heat exchanger 410 to the storage tank 150 may further include the cooler 160 for cooling the flowing carbon dioxide.

As such, the liquid carbon dioxide mixed with the foreign substances is vaporized through the distiller 400 to remove the foreign substances therefrom. In this connection, a necessary vaporization heat is obtained through the heat exchange with the already vaporized and compressed gaseous carbon dioxide.

However, in the process of using the compressor 290, oil for smooth operation of the compressor 290 may be used. This eventually mixes with the compressed gaseous carbon dioxide, so that the distiller 400 may further include an oil separator 295 (see FIG. 1) for separating the oil from the compressed gaseous carbon dioxide on the storage pipe 610.

In addition, the distiller 400 may further include the suction pipe 641 that connects the distillation tank 401 and the compressor 290 to each other to flow the gaseous carbon dioxide from the distillation tank to the compressor 290, the discharge pipe 651 that connects the compressor 290 and the heat exchanger 410 to each other to flow the compressed gaseous carbon dioxide to the heat exchanger 410, and the storage pipe 610 that connects the heat exchanger 410 and the storage tank 150 to each other to flow the compressed gaseous carbon dioxide to the storage tank 150.

FIG. 9 shows schematic pipes and valves required for the distillation. The opening and closing of the pipe using the valve may be controlled by the controller 900.

The laundry treating apparatus 1000 includes the pressure vessel 200 that maintains the carbon dioxide contained therein at the pressure higher than the atmospheric pressure, the storage tank 150 for storing the carbon dioxide to supply the carbon dioxide to the pressure vessel 200, the distillation tank 401 that stores the carbon dioxide discharged from the pressure vessel 200 in order to remove the foreign substances dissolved in the carbon dioxide discharged from the pressure vessel 200, and the gas supply pipe 690 that connects the distillation tank 401 and the pressure vessel 200 to each other to supply the gaseous carbon dioxide stored in the distillation tank 401 to the pressure vessel 200.

Preferably, the gas supply pipe 690 may connect the top of the distillation tank 401 and the top of the pressure vessel 200 to each other. This is because the gaseous carbon dioxide occupies the upper portions of the distillation tank 401 and the pressure vessel 200.

The laundry treating apparatus 1000 may further include a gas supply control valve 695 positioned on the gas supply pipe 690 to open and close the gas supply pipe 690.

In addition, the laundry treating apparatus 1000 may further include a pressure sensor 2101 for measuring the internal pressure of the pressure vessel 200. On the other hand, by opening the gas supply control valve 695 for a preset opening time or supplying a preset flow rate using a flow rate sensor until the pressure vessel 200 reaches the preset equilibrium pressure, the pressure sensor 2101 may be replaced.

The laundry treating apparatus 1000 may further include a first supply pipe 621 for supplying the gaseous carbon dioxide stored in the storage tank 150 to the pressure vessel 200 by connecting the storage tank 150 and the pressure vessel 200 to each other, and a second supply pipe 622 for supplying the liquid carbon dioxide stored in the storage tank 150 to the pressure vessel 200 by connecting the storage tank 150 and the pressure vessel 200 to each other.

Preferably, the first supply pipe 621 may be connected to the top of the storage tank 150, and the second supply pipe 622 may be connected to the bottom of the storage tank 150.

A first supply control valve 625 and a second supply control valve 626 may be respectively disposed on the first supply pipe 621 and the second supply pipe 622 to open and close the first supply pipe 621 and the second supply pipe 622, respectively.

In addition, the pressure vessel 200 and the distillation tank 401 may be connected to each other by a discharge pipe 630 for discharging the liquid carbon dioxide used in the pressure vessel 200, and opening and closing of the discharge pipe 630 may be controlled by the discharge control valve 635 disposed on the discharge pipe 630. The distillation tank 401 is located below the pressure vessel 200. Because of the vertical level difference, the liquid carbon dioxide may flow from the pressure vessel 200 to the distillation tank 401 using gravity.

The laundry treating apparatus 1000 may further include the suction pipe 641 that connects the distillation tank 401 and the compressor 290 to each other to flow the gaseous carbon dioxide from the distillation tank to the compressor 290, the discharge pipe 651 that connects the compressor 290 and the heat exchanger 410 to each other to flow the compressed gaseous carbon dioxide to the heat exchanger 410, and the storage pipe 610 that connects the heat exchanger 410 and the storage tank 150 to each other to flow the compressed gaseous carbon dioxide to the storage tank 150.

The laundry treating apparatus 1000 may further include a suction control valve 645 and a discharge control valve 635 for opening and closing the suction pipe 641 and the discharge pipe 651, respectively. In addition, a first storage control valve 615 and a second storage control valve 616 for opening and closing the storage pipe may be located on the storage pipe 610.

In addition, the laundry treating apparatus 1000 may further include the controller 900 that may control opening and closing of the gas supply control valve 695, the first supply control valve 625, the second supply control valve 626, the discharge control valve 635, the suction control valve 645, and the discharge control valve 655.

That is, the controller 900 may open and close each pipe using a valve corresponding to each pipe. The controller 900 may proceed with each operation by opening a pipe required at each operation of the washing cycle. In addition, the controller 900 may control the driver 500 and further control operations of the purge valve 298 and a vacuum pump 297 to be described later. The purge valve 298 and the vacuum pump 297 may be operated to discharge the gas remaining in the pressure vessel 200 before the pressurization operation or at the end of the washing cycle.

Each pipe and each valve for opening and closing each pipe shown in FIG. 9 are merely one example. Connection of the pipes may be freely modified within a limit that does not impair a purpose of each pipe mentioned above. For example, FIG. 9 shows an example in which the first supply pipe 621 and the gas supply pipe 690 form a single combined pipe before being connected to the storage tank 150 and then the single combined pipe is connected to the storage tank 150.

Accordingly, FIG. 9 shows an example of opening the suction control valve 645 and the gas supply control valve 695 and closing the first supply control valve 625 in order to flow the gaseous carbon dioxide stored in the distillation tank 401 to the pressure vessel 200.

FIG. 9 shows an example in which a portion of the gas supply pipe 690 is used as a portion of the suction pipe 641. This is possible because both the suction pipe 641 and the gas supply pipe 690 are passages through which the gaseous carbon dioxide passes, and a time during which the gas supply pipe 690 is used and a time during which the compressor 290 operates are different. When supplying the gaseous carbon dioxide to the pressure vessel 200 through the gas supply pipe 690 before the pressurization operation, the controller 900 will open the suction control valve 645 and the gas supply control valve 695, and will not operate the compressor 290. When operating the compressor 290 in the distillation operation, the controller 900 will close the first supply control valve 625 and the gas supply control valve 695, and will open the suction control valve 645 and the discharge control valve 655.

In addition, when operating the heat exchanger 410 disposed in the pressure vessel 200, the controller 900 will not operate the cooler 160, open the suction control valve 645 and the second storage control valve 616, and close the discharge control valve 655, thereby circulating the high temperature and high pressure gaseous carbon dioxide through the heat exchanger 410.

In addition, at the start of the washing cycle, before starting the pressurization operation, the controller 900 may open the purge valve 298 to discharge the gas remaining in the pressure vessel, and may lower the pressure of the pressure vessel 200 to a pressure lower than the atmospheric pressure to be close to vacuum through the vacuum pump 297.

The reason for lowering the pressure of the pressure vessel 200 to the pressure lower than the atmospheric pressure through the vacuum pump 297 is to prevent deterioration of the washing performance of the carbon dioxide by removing air and moisture other than the carbon dioxide. Thereafter, before executing the pressurization operation, the controller 900 may control the gas supply control valve 695 to open the gas supply pipe 690. The controller 900 may open the gas supply control valve 695 until the internal pressure of the pressure vessel measured through the pressure sensor 2101 reaches a preset reference pressure.

Opening the gas supply control valve 695 means that the controller 900 opens the gas supply control valve 695 to open the gas supply pipe 690, and the gaseous carbon dioxide stored in the distillation tank 401 flows to the pressure vessel 200.

Therefore, before opening the gas supply control valve 695, the internal pressure of the distillation tank 401 is higher than the reference pressure, and the pressure of the pressure vessel 200 is lower than the atmospheric pressure or close to the vacuum state.

In addition, until the reference pressure is reached, an internal temperature of the pressure vessel 200 will increase as the gaseous carbon dioxide stored inside the distillation tank 401 flows.

As described above, FIG. 9 shows an example of the pressure vessel 200 formed by the first housing 211 and the second housing 221, and including the separator 250 for dividing the inner space of the pressure vessel 200 into the first chamber 210 and the second chamber 220.

The separator 250 may include the partition wall 251 that divides the first chamber and the second chamber from each other, and supports the driver 500 and the drum. The rotation shaft of the driver 500 may pass through the partition wall and be connected to the drum 300. By the partition wall 251, the liquid carbon dioxide exists only in the first chamber 210 and is not able to flow to the second chamber 220.

In another embodiment, the pressure vessel 200 is not divided by the partition wall 251, and the liquid carbon dioxide may be accommodated in an entirety of the pressure vessel 200. That is, in one example, the drum 300 may be located inside the pressure vessel 200 and the driver 500 may also be located in the same space as the drum 300.

The cooler 160 may be disposed to cool the gaseous carbon dioxide flowing through the storage pipe after the distillation to change the phase of the gaseous carbon dioxide into the liquid carbon dioxide. The cooler 160 may include a heat exchanger in a form of a serpentine pipe and a cooling fan for blowing outside air for heat dissipation of the carbon dioxide.

FIG. 10 shows an example of making the storage tank 150 and the pressure vessel 200 into an equilibrium state by opening the first supply control valve 625 after supplying the gaseous carbon dioxide to the distillation tank 401 until the pressure of the distillation tank 401 reaches the reference pressure.

That is, after the pressure of the pressure vessel 200 reaches the reference pressure, the controller 900 may perform the pressurization operation. When the reference pressure is reached, the controller 900 may close the gas supply control valve 695 and open the first supply control valve. Accordingly, the internal pressures of the storage tank 150 and the pressure vessel 200 will reach the equilibrium state. Reaching the equilibrium state means that, as the pressures of the pressure vessel 200 and the storage tank 150 reach the equilibrium pressure, there is no more flow of the gaseous carbon dioxide between the pressure vessel 200 and the storage tank 150.

Therefore, a decrease in the internal temperature of the storage tank 150 will be smaller when the pressure of the pressure vessel 200 reaches the equilibrium pressure from the vacuum state than when the pressure of the pressure vessel 200 reaches the equilibrium pressure from the reference pressure. Preferably, the reference pressure may be set to 6 bar.

FIG. 10 shows a case in which the first supply control valve 625 and the gas supply control valve 695 are opened and the suction control valve 645 is closed due to a position of the gas supply control valve 695 in order to flow the gaseous carbon dioxide stored in the storage tank 150 to the pressure vessel 200. However, this is only an example and is able to vary depending on the connection state of the pipes as described above.

In addition, before the laundry treating apparatus 1000 is installed for use where necessary after being manufactured, a certain amount of carbon dioxide may be charged in advance in the distillation tank 401. Therefore, even when the user performs the washing cycle for the first time after the installation of the laundry treating apparatus 1000, an amount of gaseous carbon dioxide sufficient enough to be supplied to the pressure vessel 200 up to the reference pressure may be stored in the distillation tank 401.

In addition, in the replenishment operation, the controller 900 may open a replenishment pipe 683 for connecting the replenishment tank 155 and the pressure vessel 200 to each other through a replenishment tank control valve 688 to flow the carbon dioxide required for the pressure vessel 200. Thereafter, after opening the second supply control valve 626, the controller 900 may flow the liquid carbon dioxide from the storage tank 150 to the pressure vessel 200 using gravity. Thereafter, the controller 900 will proceed with an operation necessary for the washing, such as the washing operation, the rinsing operation, and the like.

The present disclosure is able to be modified and implemented in various forms, so that the scope thereof is not limited to the above-described implementations. Therefore, when the modified implementation includes the components of the claims of the present disclosure, it should be viewed as belonging to the scope of the present disclosure.

The invention claimed is:

1. A laundry treating apparatus comprising:

a pressure vessel configured to accommodate carbon dioxide therein;

a storage tank configured to store carbon dioxide therein to supply carbon dioxide to the pressure vessel;

a distillation tank configured to store carbon dioxide discharged from the pressure vessel to remove foreign substances dissolved in carbon dioxide discharged from the pressure vessel;

a gas supply pipe that connects the distillation tank and the pressure vessel to each other and is configured to supply gaseous carbon dioxide stored in the distillation tank to the pressure vessel;

a gas supply control valve positioned on the gas supply pipe and configured to open and close the gas supply pipe;

a first supply pipe that connects a top of the storage tank to the pressure vessel and is configured to supply gaseous carbon dioxide stored in the storage tank to the pressure vessel;

a first supply control valve located on the first supply pipe and configured to open and close the first supply pipe; and a controller configured to open the gas supply control valve until an internal pressure of the distillation tank reaches a preset reference pressure before opening the first supply control valve, wherein, before opening the gas supply control valve, the internal pressure of the distillation tank is higher than the preset reference pressure, and a pressure of the pressure vessel is lower than an atmospheric pressure.

2. The laundry treating apparatus of claim 1, wherein an internal temperature of the pressure vessel increases until reaching the preset reference pressure.

3. The laundry treating apparatus of claim 1, wherein the gas supply pipe connects a top of the distillation tank and a top of the pressure vessel to each other to provide a passage for carbon dioxide to flow.

4. The laundry treating apparatus of claim 1, further comprising a pressure sensor for measuring an internal pressure of the pressure vessel, wherein the controller is configured to sense the internal pressure of the pressure vessel through the pressure sensor.

5. The laundry treating apparatus of claim 1, wherein the first supply pipe and the gas supply pipe form a single combined pipe before being connected to the storage tank, and then the single combined pipe is connected to the storage tank.

6. The laundry treating apparatus of claim 1, wherein an installation vertical level of the storage tank is higher than an installation vertical level of the pressure vessel, wherein an installation vertical level of the distillation tank is lower than the installation vertical level of the pressure vessel.

7. The laundry treating apparatus of claim 1, further comprising:

a compressor located outside the distillation tank, sucking gaseous carbon dioxide from the distillation tank, and compressing gaseous carbon dioxide;

a heat exchanger located inside the distillation tank and connected to the compressor to perform heat exchange between compressed gaseous carbon dioxide and liquid carbon dioxide stored inside the distillation tank; and a storage pipe for connecting the heat exchanger and the storage tank to each other to flow carbon dioxide cooled through the heat exchanger to the storage tank.

8. The laundry treating apparatus of claim 7, further comprising:

a suction pipe for connecting the distillation tank and the compressor to each other to flow gaseous carbon dioxide from the distillation tank to the compressor; and a discharge pipe for connecting the compressor and the heat exchanger to each other to flow compressed gaseous carbon dioxide to the heat exchanger.

9. A laundry treating apparatus, comprising:

a pressure vessel configured to accommodate carbon dioxide therein;

a storage tank configured to store carbon dioxide therein to supply carbon dioxide to the pressure vessel;

a distillation tank configured to store carbon dioxide discharged from the pressure vessel to remove foreign substances dissolved in carbon dioxide discharged from the pressure vessel;

a gas supply pipe that connects the distillation tank and the pressure vessel to each other and is configured to supply gaseous carbon dioxide stored in the distillation tank to the pressure vessel;

a gas supply control valve positioned on the gas supply pipe and configured to open and close the gas supply pipe;

a first supply pipe that connects a top of the storage tank to the pressure vessel and is configured to supply gaseous carbon dioxide stored in the storage tank to the pressure vessel;

a first supply control valve located on the first supply pipe and configured to open and close the first supply pipe;

a controller configured to open the gas supply control valve until an internal pressure of the distillation tank reaches a preset reference pressure before opening the first supply control valve; and a vacuum pump for discharging air inside the pressure vessel, wherein the controller is configured to operate the vacuum pump to make an internal pressure of the pressure vessel lower than an atmospheric pressure before opening the gas supply control valve.

10. The laundry treating apparatus of claim 9, wherein the controller is configured to close the gas supply control valve and open the first supply control valve to bring an internal pressure of the storage tank and the internal pressure of the pressure vessel to an equilibrium pressure when the preset reference pressure is reached.

11. The laundry treating apparatus of claim 10, further comprising:

a second supply pipe connected to the storage tank and the pressure vessel to supply liquid carbon dioxide stored in the storage tank to the pressure vessel; and a second supply control valve located on the second supply pipe to open and close the second supply pipe, wherein the controller is configured to open the second supply control valve when the equilibrium pressure is reached to flow liquid carbon dioxide stored in the storage tank to the pressure vessel.

* * * * *